US008655357B1

(12) United States Patent
Gazzard et al.

(10) Patent No.: US 8,655,357 B1
(45) Date of Patent: Feb. 18, 2014

(54) SYSTEMS AND METHODS FOR IDENTIFYING APPLICATIONS ON A COMMUNICATIONS DEVICE

(75) Inventors: Daryl Robert Gazzard, Alpharetta, GA (US); Matthew Wayne Stafford, Austin, TX (US); Jeffrey Clinton Mikan, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1527 days.

(21) Appl. No.: 11/552,724

(22) Filed: Oct. 25, 2006

Related U.S. Application Data

(60) Provisional application No. 60/823,124, filed on Aug. 22, 2006.

(51) Int. Cl.
*H04W 4/00* (2009.01)

(52) U.S. Cl.
USPC ........ 455/435.1; 717/174; 717/175; 717/176; 717/177; 717/178

(58) Field of Classification Search
USPC .............................................. 455/410, 435.1
See application file for complete search history.

(56) References Cited

U.S. PATENT DOCUMENTS

| | | | | |
|---|---|---|---|---|
| 7,184,554 | B2 * | 2/2007 | Freese | 380/270 |
| 2003/0123481 | A1 * | 7/2003 | Neale et al. | 370/466 |
| 2005/0048971 | A1 * | 3/2005 | Findikli et al. | 455/435.1 |
| 2005/0153741 | A1 * | 7/2005 | Chen et al. | 455/558 |
| 2006/0172737 | A1 * | 8/2006 | Hind et al. | 455/435.2 |

OTHER PUBLICATIONS

IP-Based Next Generation Wireless Networks, Systems, Architectctures, and Protcols, by Jyh-Cheng Chen, and Tao Zhang, Wiley Interscience, (c) 2004 pp. 136-139.*

* cited by examiner

*Primary Examiner* — Lewis West
*Assistant Examiner* — Joshua Schwartz
(74) *Attorney, Agent, or Firm* — Parks IP Law LLC; Mickki D. Murray, Esq.

(57) ABSTRACT

The present invention provides systems, methods, and devices adapted to notify a communications network that an application is present on a communication device by sending a feature tag that identifies the application to the communications network. The communications network can register, re-register, or de-register an application with an application server in response to receiving the feature tag. The invention provides a method by which an application can be registered in accordance with a feature tag and satisfaction of predetermined registration conditions. A further method of the invention can include updating a presence server in response to receiving a feature tag. The systems, methods and devices of the invention facilitate registration of applications in way that conservers network resources and decreases signaling traffic over the air interface.

20 Claims, 20 Drawing Sheets

SYSTEMS AND METHODS FOR IDENTIFYING APPLICATIONS ON A COMMUNICATIONS DEVICE

CROSS-REFERENCE TO RELATED APPLICATIONS

This application claims priority to co-pending U.S. Provisional Application No. 60/823,124 filed on Aug. 22, 2006, which is entirely incorporated herein by reference.

FIELD OF INVENTION

In general, the systems and methods of the invention relate to the registration of applications on a handheld device.

BACKGROUND OF INVENTION

As telecommunications technology continues to evolve, the use of Internet Protocol (IP) for communications continues to expand for wired and wireless communication devices. Web surfing, music streaming, and other media services previously limited to computers, are now performed by wireless communication devices.

Although wired and wireless devices can engage in similar telecommunication services, the allocation of communication bandwidth by the network to wired and wireless devices differs. Wired devices such as landline telephones are typically circuit switched, and are generally allocated a designated amount of bandwidth dedicated to the devices over the course of a telephone conversation. Wireless communications, on the other hand, are not allocated a designated bandwidth. Instead, wireless communication devices share bandwidth using time-division multiplexing, frequency-division multiplexing, code division multiplexing, or other schemes, as practiced, for example, by the High-Speed Downlink Packet Access (HSDPA), Code Division Multiple Access (CDMA), Wide-Band CDMA (WCDMA), Enhanced Data rates for Global Evolution (EDGE), and General Packet Radio Service (GPRS) systems. Communication resources are dynamically allocated by the network as needed to serve active network users.

Contemporary communication devices can house multiple applications that facilitate various forms of communication, such as Voice over IP (VoIP), Instant Messaging (IM), or Push over Cellular (PoC). To send and receive messages via a type of service, a user is granted a contact address by the communications network that can be used in conjunction with an application on the user's communication device. A wireless device performs a registration procedure to in order to obtain most communication services. Typically, registration of a communication device alone is not sufficient for the efficient allocation of communication resources. Instead, the individual applications that reside on the communication device are registered, particularly when the communications implemented by the applications, such as VoIP, PoC, or IM communications, are facilitated by dedicated application servers or presence servers in the network.

IP packet communication via a wireless network is facilitated by the IP Multimedia System (IMS) network. The IMS network can include an IMS core as well as gateways to the Public Switched Telephone Network (PTSN) and other legacy networks. Comprising the IMS core are various proxy servers that receive, authenticate, manage and route communications between and among parties that access the IMS network through a variety of communication devices and local access networks. The IMS network supports a standardized signaling protocol, the Session Initiation Protocol (SIP) which can be used to establish, modify and terminate peer-to-peer communications between and among users of various types of communication devices, including both fixed and mobile. Designed by the Third Generation Partnership Project (3GPP) and the Internet Engineering Task Force (IETF), the IMS network provides 3 G communication services that allow multimedia communications to be performed with a desired level of security and quality of service.

As currently implemented by the IMS core, there are two methods by which applications can register in order to communicate over the IMS network. In simplest terms, registration is a process by which bindings are created that associate an address-of-record Uniform Resource Identifier (URI) with one or more contact addresses so that messages can be routed and delivered to a user at an IP address associated with an application on a communication device. For example, telephone numbers, email addresses, etc. can be registered so that a subscriber can receive messages at the registered address. In a first registration method, each application resident on a communication device registers separately with an application server dedicated to supporting the particular application. For example, suppose a user is employing a communication device on which applications A, B, and C reside. When the communication device is powered on, application A sends a message via the IMS core to the application A server, thereby registering with the application A server so that it can send or receive messages of a type managed by that server, for example VoIP messages managed by a VoIP server. Likewise, applications B and C send a similar message through the IMS core to application B and C servers. An acknowledgement message confirming the application registration is sent from each application server to the communication device in return. Although this method is adequate for registering the applications with the appropriate servers, it requires multiple signal or control messages to be transmitted by the communication device. Furthermore, where each application server responds with an acknowledgement message, this method also requires that three acknowledgement messages be sent to the communication device. Thus, while adequate to achieve its purpose, the method requires the transmission of several signal messages over the network, consuming valuable network resources, generating excessive traffic over the air interface, and increasing the latency of the communication system.

The second method currently implemented by the IMS network strives to increase the efficiency of the registration process by decreasing the volume of signaling traffic over the air interface. In this method, a single registration signal is sent from a communication device to a proxy server within the IMS core. Upon reception of the registration signal from the communication device, the IMS proxy server retrieves subscriber information stored at a subscriber information database, such as the Home Subscriber Service (HSS), to determine the services that are included in the user's network subscription. Using that information, the proxy server can then perform a third party registration process by which it registers the applications with the appropriate application servers according to the services to which the user subscribes. For example, suppose a user has subscribed to services which support applications A, B, and C. When a signal from a communication device associated with the user is received at the IMS core, the proxy server queries the HSS to authenticate the user and determine the services to which the user has subscribed. In this case, the data retrieved from the HSS will indicate that the user is subscribed to services which support applications A, B, and C. Accordingly, the proxy server will in turn register those applications with the appropriate application servers. A single acknowledgement confirming the registration of the applications is sent from the IMS core to the communication device.

This second method provides an application registration scheme that reduces traffic flow over the air interface since only one message is sent from the communication device to the IMS network, and one acknowledgement is sent from the IMS core to the communication device. However, the process relies on the accuracy of subscriber data stored at the HSS. Additional applications can easily be downloaded to, and previously installed applications can be deleted from, contemporary wireless devices. As a result, information stored in the HSS may not accurately reflect current device capabilities. Of further significance is the use of a Subscriber Identity Module (SIM) card in a wireless device. A SIM card stores unique identity information associated with a user and can be exchanged among multiple communication devices. Thus, although a SIM card may identify a user as a subscriber to one or more particular services, such as a VoIP service, the SIM card may be employed in a device that is not equipped with VoIP application software. Accordingly, third party registration performed by the IMS core may result in an assigned contact address associated with a particular user for a particular application even though the wireless device is unable to interact with that server. As a result, resources are needlessly consumed.

Generally, when an application is registered with an application server, the registration period expires after a designated period of time. Typically, registration can be extended by re-registering with the application server prior to the expiration of the designated time period. However, the issues that plague the registration process are again present during the re-registration process, namely the signal traffic volume and the lack of dynamic information regarding the actual communication capabilities of a communication device.

What is needed is a method by which only those applications physically present on the particular communication device in operation are registered with application servers. There is a further need for a method to register an application with an application server that conserves communication resources by reducing the signaling traffic to and from the communication device.

SUMMARY OF THE INVENTION

The present invention provides a wireless communication device comprising a processor and instructions for making the processor operable scan the device memory for wireless network supported applications, generate a message based on the scan, the message including a first feature tag corresponding to a first wireless network supported application present in the memory, and transmit the message to the wireless network.

In some embodiments of the invention, the message can further include a second feature tag corresponding to a second wireless network supported application present in the memory of the wireless device. The message can further include a third feature tag corresponding to a third wireless network supported application present in the memory of the device. The message can comprise a session initialization protocol (SIP) message in some embodiments, and the message can be an SIP register message. An SIP register message so utilized can include an additional field for placement of the first feature tag. The wireless network supported applications can be Internet protocol multimedia system (IMS) applications.

The wireless communication device can be configured to trigger the scan upon the device powering on, upon a loading of an application into the memory, upon removal of an application from the memory, and/or upon the insertion of a subscriber identification module (SIM) card into the device. In some embodiments the message can include a first feature tag status value indicating whether the first application should be registered with the wireless network.

The message can further include a second feature tag corresponding to a second wireless network supported application present in the memory of the device, and a second feature tag status value, the second feature tag status value indicating whether the second application should be registered with the wireless network. In some embodiments the feature tag status values can be set based on a current wireless communication type. The device can be configured to trigger the scan for applications based a change of the current wireless communication type.

A system according to the present invention includes an application server, a wireless communication device including a first application, the wireless communication device configured to transmit a message to the wireless communication network, the message including a first feature tag indicating that the first application is present on the wireless communication device, and a network element of the wireless communication network configured to receive the message from the wireless communication device and send a first registration message corresponding to the first application to the application server.

In some embodiments the application server can be an Internet protocol multimedia system (IMS) application server, the first application can be an IMS application, and the network element can be an IMS Call State Control Function (CSCF). The system can include a second application server, and the wireless communication device of the system can further include a second application. The message can further include a second feature tag indicating that the second application is present on the wireless communication device, and the network element can be further configured to send a second registration message corresponding to the second application to the second application server. The network element of the system can be configured to collect application server acknowledgement messages, assemble the acknowledgement messages into a master acknowledgement message, and send the master acknowledgement message to the wireless communication device.

A method of registering an Internet protocol multimedia system (IMS) application with an IMS core of a wireless communication system according to the present invention can comprise sending a message to the IMS core from a wireless communication device including a first feature tag corresponding to a first application present on the device. In some embodiments the method can further comprise receiving the message at the IMS core, sending a first registration message to the IMS server that services the first application, where the first registration message can identify the wireless communication device. The IMS server can be an application server. The IMS server can be a presence server.

The message can further include a second feature tag which can correspond to a second application present on the device, where the method can further comprise sending a second registration message to the IMS server that services the second application. The message in the method can further include a first feature tag status value. The feature tag status value can indicate if the first application should be registered with the IMS core. The first feature tag status value can be set to indicate that the first application should be registered if a wireless communication access type is a first wireless communication access type, and the first feature tag status value is set to indicate that the first application should not be registered if the wireless communication access type is a second wireless communication access type and/or not the first wireless communication access type. The first feature tag status value can be set based on whether the current wireless communication network is a home network or a roaming network.

DETAILED DESCRIPTION OF PREFERRED EMBODIMENTS

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

In general, the systems and methods of the present invention are directed toward indicating the presence of an application on a communications device, wherein a communication device is any device capable of performing telecommunications facilitated by a communications network, including but not limited to a cellular telephone, personal digital assistant (PDA), Blackberry® or any other device capable of data communications. The methods of the invention facilitate efficient registration of an application in a manner that dynamically and accurately accommodates current application status, conserves communication resources and reduces traffic over the air interface. In an exemplary embodiment, a method of the invention includes: providing a feature tag that identifies an application, and receiving said feature tag at a communications network adapted to execute a desired action in accordance with said feature tag. A method of the invention can include registration, re-registration, or de-registration of the application with an application server, or providing presence update information to a presence server in accordance with the feature tag. A further method in accordance with the invention includes registering an application in accordance with both the feature tag and any predetermined registration conditions associated with the application.

Figure 1:
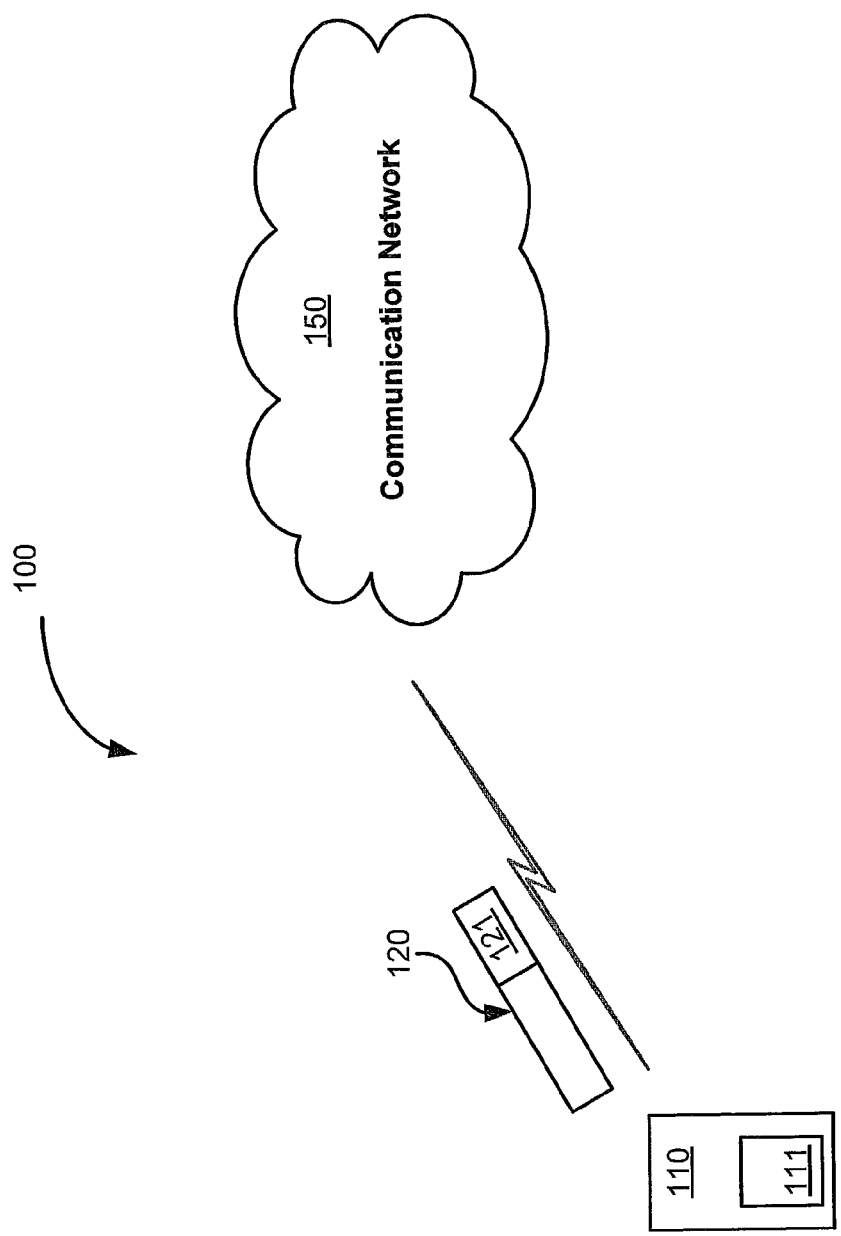
FIG. 1 shows an exemplary system of the invention.

FIG. 1 shows a system 100 of the present invention that includes a communication device 110, and a communications network 150 which facilitates telecommunications by the communication device 110. In an exemplary embodiment, the communication device 110 is a handheld device which accesses the communications network 150 via a radio access network not shown in the figure. As shown In FIG. 1, an application 111 can reside on the communications device 110 to facilitate communication via the communications network 150. The application 111 can be any type of software, firmware, hardware or combination thereof that enables a user to send or receive messages via the communications network 150. In an exemplary embodiment, the application 111 can receive messages addressed to a particular IP contact address associated with the subscribing user of the communication device 110. By way of example, but not limitation, the application 111 can be a Voice over IP (VoIP), Push over Cellular (PoC), or Instant Messaging (IM) application.

As shown in FIG. 1, a signal message 120 can be sent from the communication device 110 to the communications network 150. The signal message 120 can include a feature tag 121 that identifies the application 111 on the communication device 110. Inclusion of the feature tag 121 within the signal message 120 can indicate to the communications network 150 that the application 111 is present at the communication device 110.

Figure 2:
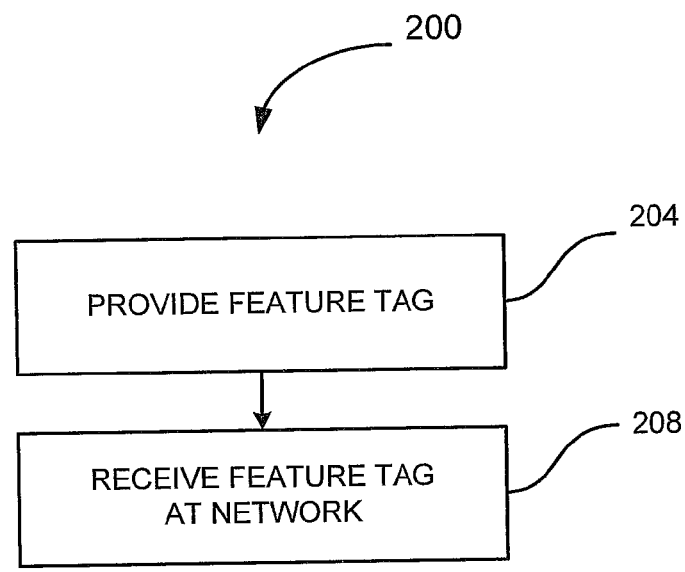
FIG. 2 shows a flow diagram of an exemplary method of the invention.

FIG. 2 shows a flow diagram of a method 200 for indicating the presence of an application 111 on a communication device 110 to a communications network 150. At block 204, the feature tag 121 that identifies the application 111 resident on the communication device 110 can be provided. In an exemplary embodiment, the feature tag 121 is placed in a signal message 120 that originates at the communication device 110. The signal message 120 is the vehicle by which the feature tag 121 is delivered to the communications network 150. It can include additional headers, and message fields in addition to the feature tag 121. In an exemplary embodiment, the signal message 120 generally conforms to the format of a SIP REGISTER message currently employed in communications systems that support the SIP protocol. The SIP REGISTER message is used to add or remove bindings between an address-of-record and one or more contact addresses. Message fields can be added to the standard SIP REGISTER message to accommodate the expression of the feature tag 121. However the signal message 120 of the present invention can be formatted to conform to any message format and communication protocol that can include the feature tag 121, be transmitted by the communication device 110, and be received and utilized the by communications network 150.

Figure 3A:
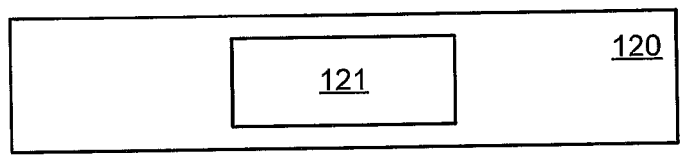
FIG. 3A shows an exemplary embodiment of a feature tag of the invention.

The feature tag 121 can be expressed in a variety of ways, so long as it can identify the application 111. In an exemplary embodiment, the feature tag 121 can be included in the signal message 120 as shown in FIG. 3A. The presence of the feature tag 121 within the signal message 120 can indicate the presence of the application 111 at the communication device 110. In a further embodiment of the invention, the signal message 120 can include a feature tag status value 124 associated with the feature tag 121. The feature tag status value 124 can be set to TRUE or 1 or some other predetermined value that can indicate that the application 111 identified by the feature tag 121 is present at the communication device 110.

Figure 4:
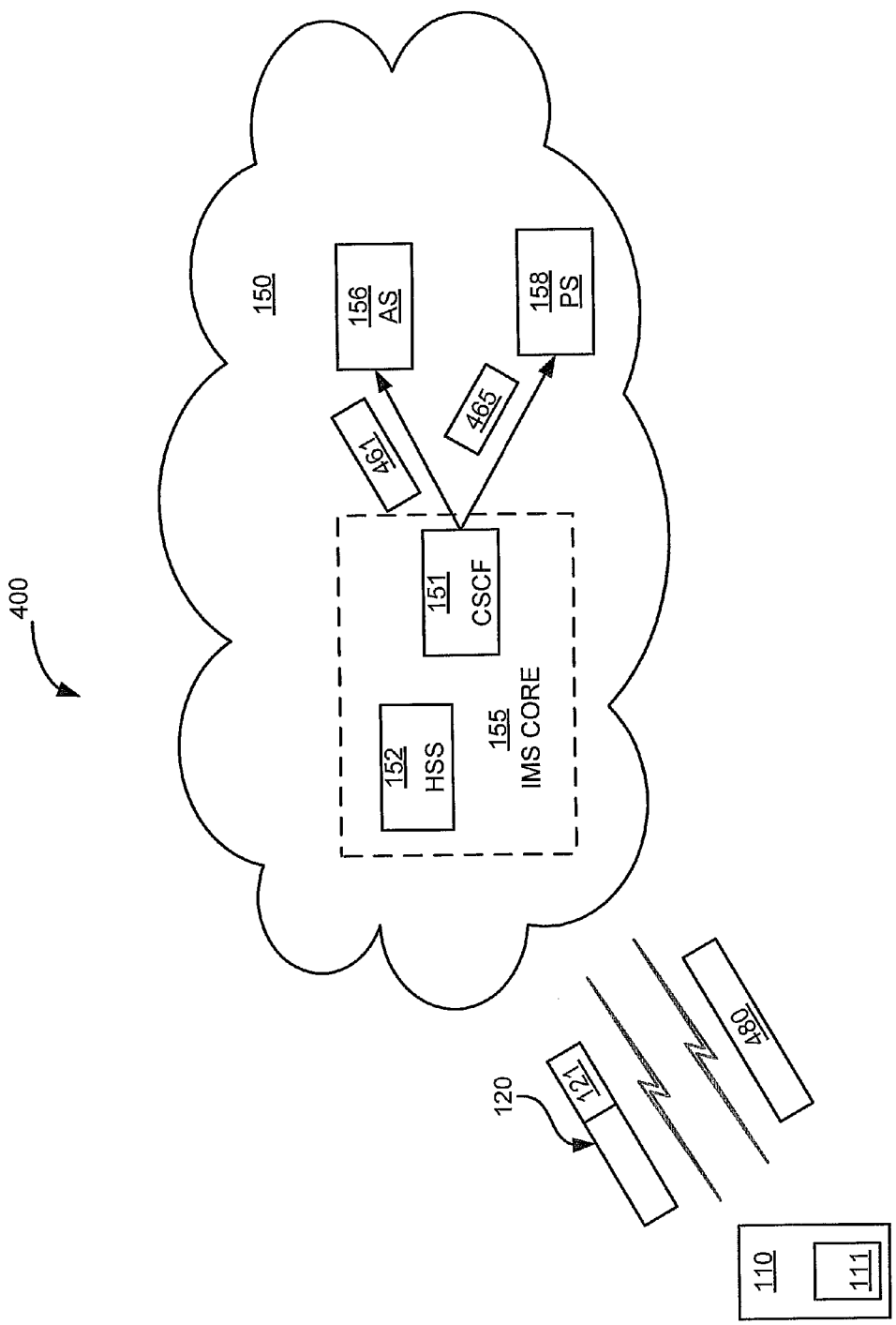
FIG. 4 shows an exemplary system of the invention.

At block 208, the feature tag 121 can be received at the communications network 150. Referring to FIG. 4, in an exemplary embodiment, the communications network 150 includes the IMS core 155, and can also include application servers (AS), presence servers (PS), media servers (MS) and gateways to legacy networks. The IMS core 155 can include a plurality of Call State Control Functions (CSCFs) 151 that can receive, authenticate, route, and manage control or signal messages sent between IMS subscribers to initiate, terminate, and otherwise orchestrate peer-to-peer sessions. There are three primary types of CSCFs 151: the Proxy-CSCF (P-CSCF), the Interrogating-CSCF (I-CSCF) and the Serving-CSCF (S-CSCF), each with designated functions within the IMS core 155. In addition to the CSCFs 151, the IMS core 155 can also include a home subscriber service (HSS) 152, as well as other IMS core 155 components not shown. In an exemplary embodiment, the feature tag 121 is received at an S-CSCF of the IMS core 155. However, depending on the IMS core 155 architecture, a network component other than, or in addition to, the S-CSCF can receive the feature tag 121. For example, the signal message 120 containing the feature tag 121 can be received at a P-CSCF and then routed directly or indirectly to the S-CSCF. Likewise, when sent to a communications network 150 other than one containing the IMS core 155, the feature tag 121 can be received at one or more other network components.

The method 200 implemented by the system 100 can provide a way to inform the communication system 150 that the application 111 is present at the communication device 110. Thus the communication system 150 can receive dynamic information from the communication device 110 concerning current communication capabilities. The communications network 150 can also execute a desired action in response to receiving the feature tag 121. For example, the communications network 150 can perform third party registration of the application 111 based on the feature tag 121.

FIG. 4 depicts an exemplary system 400 of the invention. In the system 400, the communications system 150 is shown as including the IMS core 155 comprising the CSCF 151 and the HSS 152. The IMS core 155 is communicatively coupled to an AS 156 associated with the application 111 and a presence server (PS) 158. For example, the application 111 can be a VoIP application, and the AS 156 a VoIP server. Alternatively, the application 111 can be an IM application or similar type of application for which presence information is maintained and the PS 158 can maintain presence information regarding the application 111.

Figure 3B:
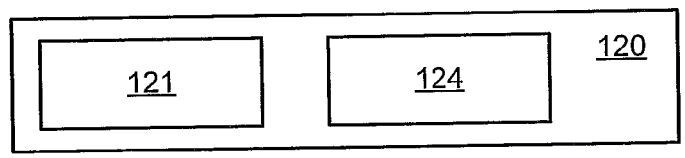
FIG. 3B shows a further embodiment of a feature tag of the invention.
Figure 5A:
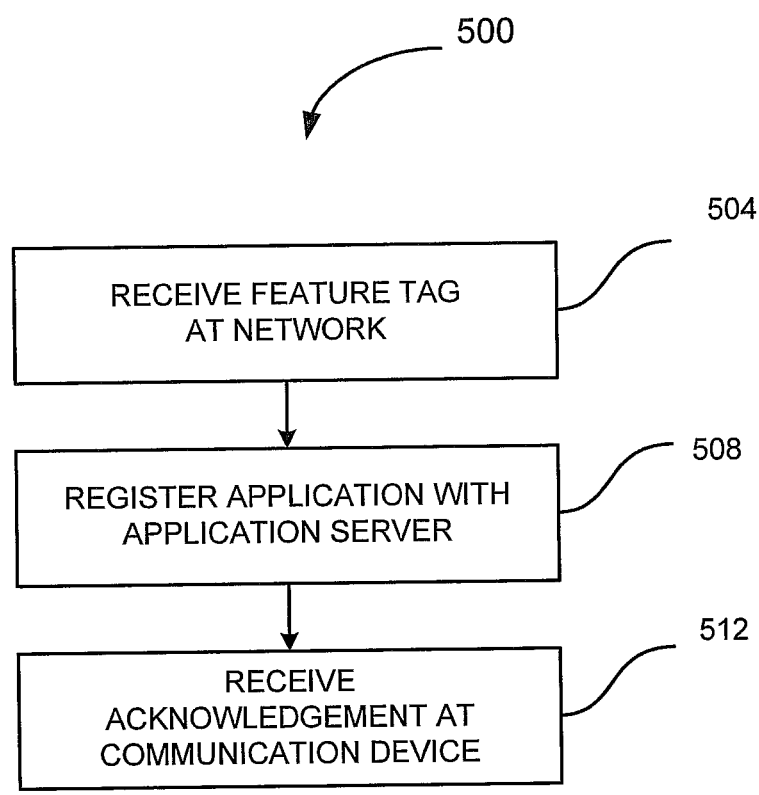
FIG. 5A shows a flow diagram of an exemplary method of the invention.

FIG. 5A shows a flow diagram of a method 500 of the invention that can be implemented by the system 400 to perform third party registration of the application 111. At block 504 the feature tag 121 identifying the application 111 can be received at the communications network 150. As shown in FIGS. 1, 3A, and 3B, the feature tag 121 can be placed in the signal message 120 that originates at the communication device 110. As stated earlier, in an exemplary embodiment the signal message 120 is the SIP REGISTER message which can be adapted to include the feature tag 121. In the system 400, the feature tag 121 can be received at the CSCF 151 of the IMS core 155. The CSCF 151 can be any CSCF of the IMS core 155; however, in a preferred embodiment the CSCF 151 is an S-CSCF. It is noted that prior to reception at the CSCF 151, the signal message 120 and the feature tag 121 can be received at one or more other IMS core components and then routed to the CSCF 151.

At block 508, the application 111 can be registered with the appropriate AS, i.e. the AS which is dedicated to supporting application 111 service, which, in the system 400 is the AS 156. Registration with the AS 156 can be performed by sending a server registration signal 461 to the AS 156. In an exemplary embodiment, the server registration message 461 generally conforms to the SIP REGISTER message, and is sent from the CSCF 151 of the IMS core 155, which is preferably an S-CSCF. At block 512 an acknowledgement 480 can be received at the communication device 110 which can confirm the registration of the application 111. In an exemplary embodiment, the acknowledgement 480 is a SIP 200 OK message that, as currently implemented by the IMS, includes a listing of current application registrations. In a further embodiment, when the application 111 is registered with the AS 156, the acknowledgement 480 can include the feature tag 121 with its associated feature tag status value 124 which can be set to TRUE to reflect successful registration. Unsuccessful registrations can be indicated when the feature tag value status 124 is set to FALSE.

Figure 5B:
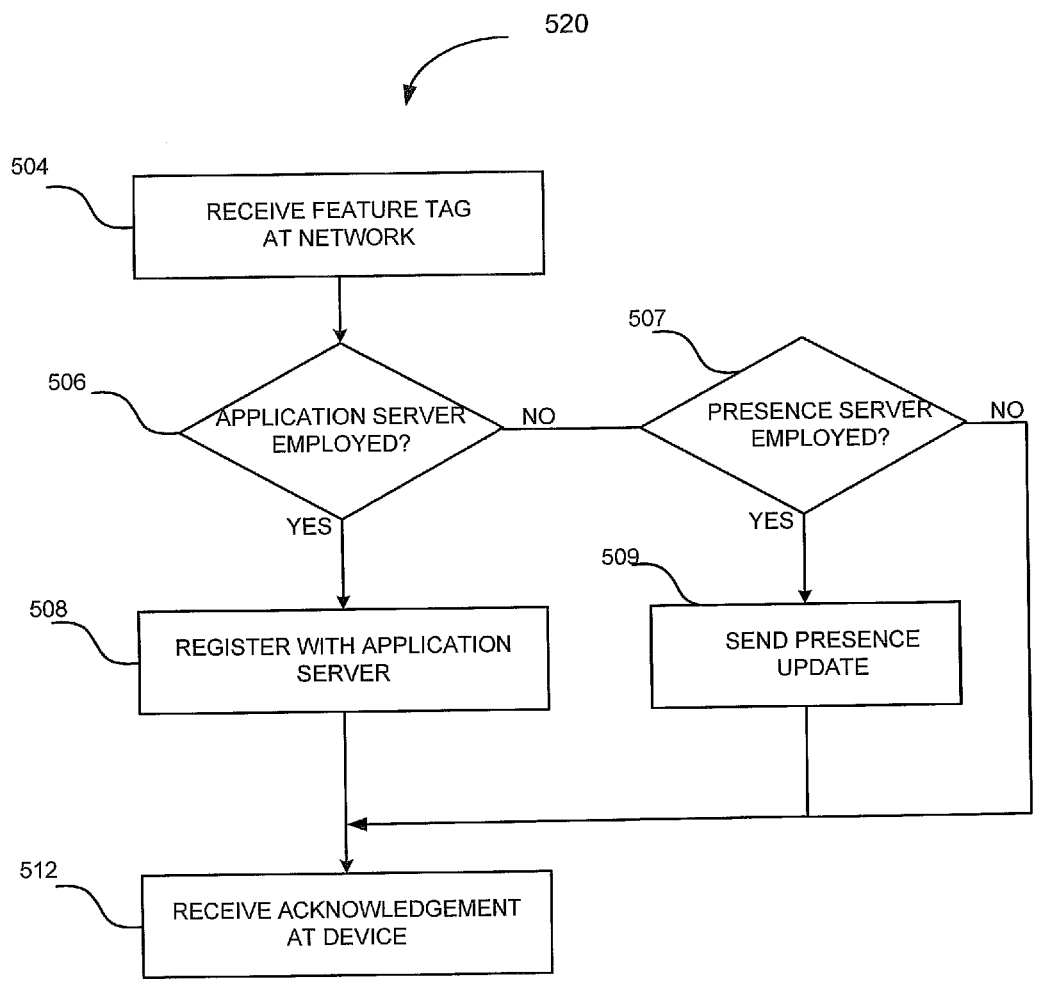
FIG. 5B shows an exemplary method to register an application in accordance with the invention.

FIG. 5B depicts a further method 520 of the invention. At block 504 the feature tag 121 can be received at the communications network 150. At block 506 a check can be performed to determine whether the application 111 identified by the feature tag 121 is serviced by an AS. If so, the server registration signal 461 can be sent to the AS 156 at block 508. If there is no application server associated with the application 111, a check can be performed at block 507 to determine whether presence information regarding the application 111 is to be maintained. If so, a presence update message 465 can be sent to the PS 158 at block 509.

Figure 6:
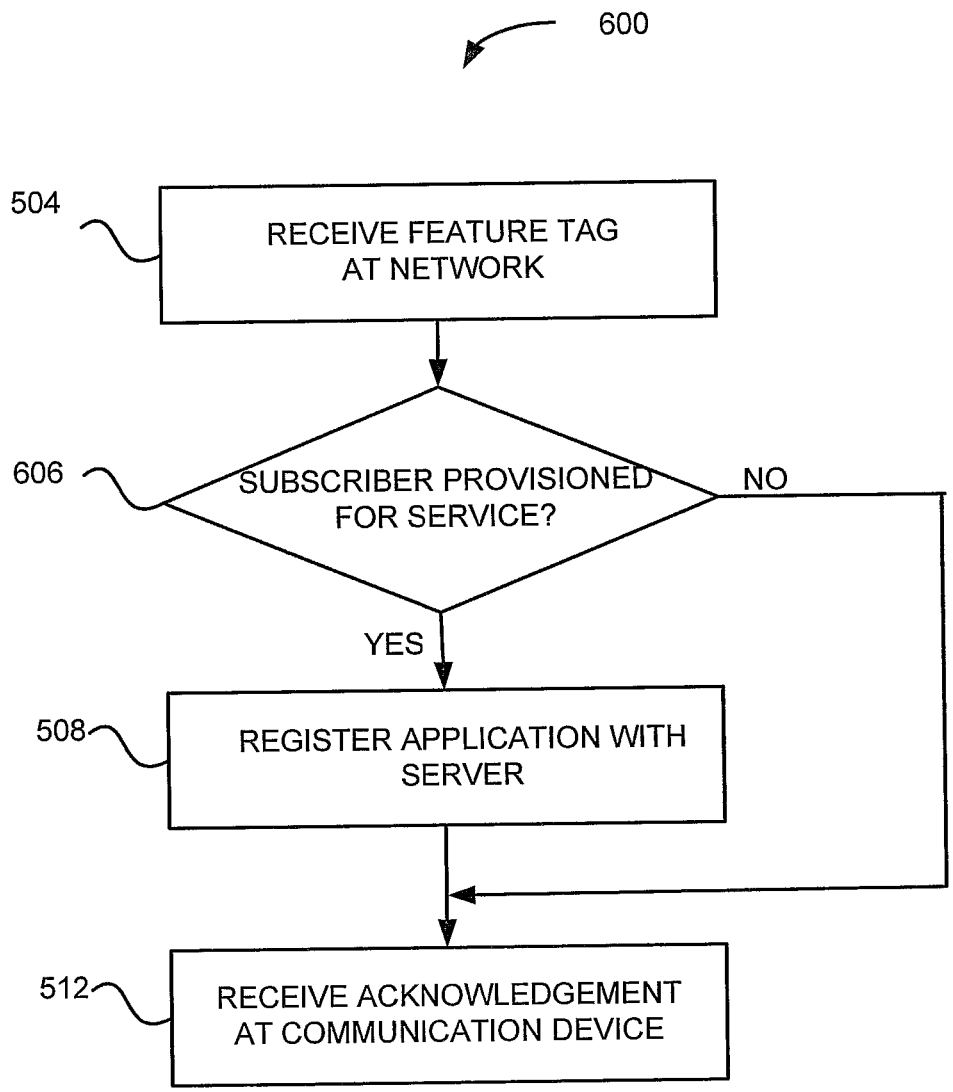
FIG. 6 shows a flow diagram of an exemplary method of the invention.

Another factor to consider when performing third party registrations of applications is whether the subscriber is provisioned for the service implemented by the application. As shown in FIG. 6, a method 600 of the invention provides a process by which the application 111 can be registered in accordance with the feature tag 121 and subscriber provisioning at the network 150. The method 600 includes a decision block 606 at which the communications network 150 can determine whether the subscriber is provisioned for the type of service facilitated by the application 111. Subscriber identification information can be expressed in the signal message 120 so that the communications network 150 is provided the identity of the user of the communication device 110 and the application 111. In an exemplary embodiment, the signal message 120 is received at the CSCF 151 of the IMS core. Using the subscriber identification information contained in the signal message 120, the CSCF 151 can retrieve subscriber information from the HSS 152 to verify that the subscriber is provisioned for the application 111 service. If the subscriber is provisioned for service related to the application 111, registration of the application 111 with the AS 156 can be performed at block 508, so that the application 111 can be registered in accordance with the feature tag 121 when the subscriber is provisioned for the application 111 service.

The methods 500 and 600 can provide third party registration of the application 111 in a manner in which the communications network 150 is provided dynamic information regarding the application 111. By registering the application 111 in accordance with the feature tag 121, registration is not performed when the application 111 is not physically on the device 110. Thus, the communications network 150 resources can be used efficiently, and error messages resulting from failed attempts to deliver messages to unregistered applications can be avoided.

Figure 7:
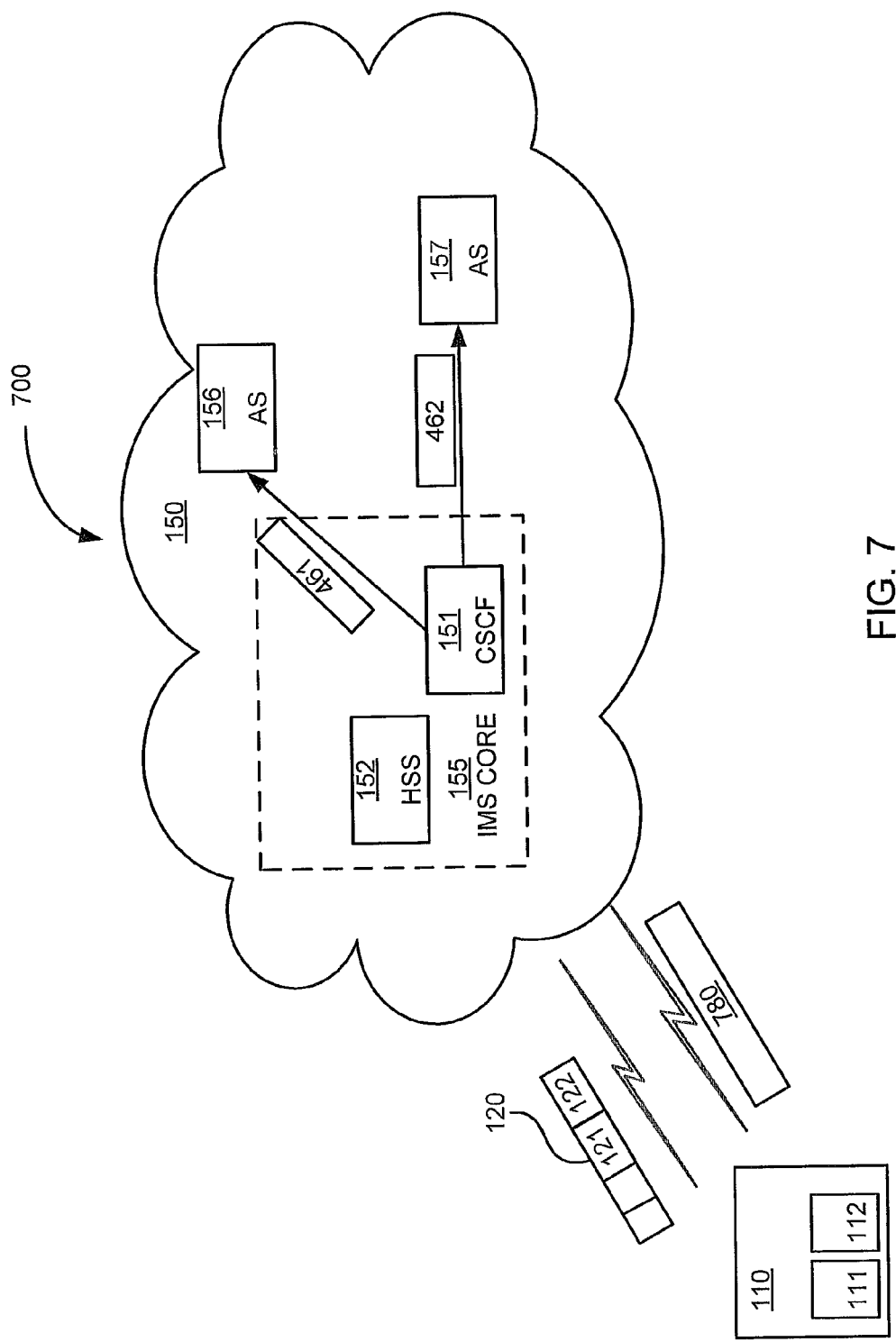
FIG. 7 shows an exemplary system of the invention.

FIG. 7 shows a further system 700 in accordance with the invention, in which the communication device 110 contains two applications, the application 111, and an application 112. The applications 111 and 112 can be any applications compatible with communication device 110 and the communications network 150. The communications network 150 of the system 700 comprises the IMS core 155 as well as two application servers, the AS 156, and an AS 157, which are dedicated to facilitating communications implemented by the applications 111 and 112, respectively. By way of example and not of limitation, the application 112 can be a VoIP application, and the AS 156 a VoIP server; and the application 112 can be a PoC application and the AS 157 a PoC server. Although shown as having two applications, the communication device 110 can be loaded with any number of applications.

The methods 500 and 600 can be used to register both of the applications 111 and 112 with the appropriate application servers 156, and 157 respectively. Referring to FIGS. 6 and 7, at block 504, the feature tag 121 associated with the application 111 and a feature tag 122 associated with the application 112 can be received at the communications network 150. In an exemplary embodiment, the feature tags 121 and 122 are included within the signal message 120, which originates at the communication device 110. The signal message generally conforms to the SIP REGISTER message, and is received at the CSCF 151 of the IMS core 150. Fields may be added to the SIP REGISTER message to accommodate a plurality of feature tags and associated feature tag status values so that multiple applications can be registered via a single signal message 120. In one preferred embodiment, the signal message 120 is received at the S-CSCF of the IMS core 155. At block 606 a check can be performed to determine whether the services associated with the applications identified by the feature tags 121 and the feature tag 122 are provisioned for the subscriber identified in the signal message 120. If both services are provisioned for the user, at block 508 the server registration signal 461 can be sent to the AS 156 to register the application 111, and a second server registration signal 462 can be sent to the AS 157 to register application 112. At block 512, an acknowledgement message 780 can be sent from the communications network 150 to the communication device 110 that can confirm the successful registration of both of the applications 111 and 112. Thus, the methods 500 and 600 can provide a process to register one or more applications on a communication device 110 in a manner that considers current capabilities, reduces traffic over the air interface, and conserves communication resources. A single signal message 120 can be sent over the air to the communications network 150 to register the applications 111 and 112, and in some embodiments a single acknowledgement 780 can be sent over the air to the communication device 110 to confirm registration. This is in contrast to the prior art registration method in which each application sent an individual message to the communications network in order to register, and a registration acknowledgement was returned for each registration.

The methods 500 and 600 of the present invention consider dynamic information so that registrations are not performed when applications are not physically present on the communication device 110. This is an improvement over the prior art method in which a single message is sent from the communication device 110 to the communications network 150, but the communications network 150 uses only that information stored in a subscriber database, such as the HSS 152, in order to register the subscriber for services facilitated by application servers 156 and 157. The prior art method is prone to errors when there is a discrepancy between the applications physically present on the communication device 110 and the subscriber information contained in the subscriber database. The methods of the present invention avoid those errors as current information is provided to the communications network 150 via the feature tags 121 and 122.

In many wireless communications networks, registration for a particular type of service expires after a predetermined time period, unless an indication is made to the communications network that a registration is to be extended so that data service can be continued. In the IMS network, the SIP REGISTER message includes an expiration field in which a registration duration period is set. Service can be continued beyond the duration period, or service options and parameters can be changed, by sending a subsequent SIP REGISTER message prior to the expiration of the current registration period. Thus, the SIP REGISTER message can be used to initially register for service, to re-register an existing service, or to alter parameters on an existing service. As currently implemented by the IMS, if a user wishes to continue a first registered service, but drop a second registered service, a first signal can be sent to re-register for desired service, and a second signal can be sent to de-register a no longer desired second registered service. This prior art method requires the transmission of several signals over the air interface that not only increase traffic, but also increase the latency of the overall communications network. By including one or more feature tags 121 within a re-registration signal message, the methods of the present invention can be used to re-register one or more currently registered applications, re-register one or more currently registered applications and add one or more new registrations, and re-register one or more currently registered applications and de-register one or more currently registered applications in a manner that decreases the amount of signaling traffic.

FIGS. 8A-9C show exemplary embodiments of the invention that can be used to re-register for a first service and register for a second service, or to re-register for a first service and de-register for a second service. FIG. 8 shows a system 800 in accordance with the invention. The system 800 includes the communication device 110 and the communications network 150 which comprises the IMS core 155 and the AS 156 and 157.

Figure 8A:
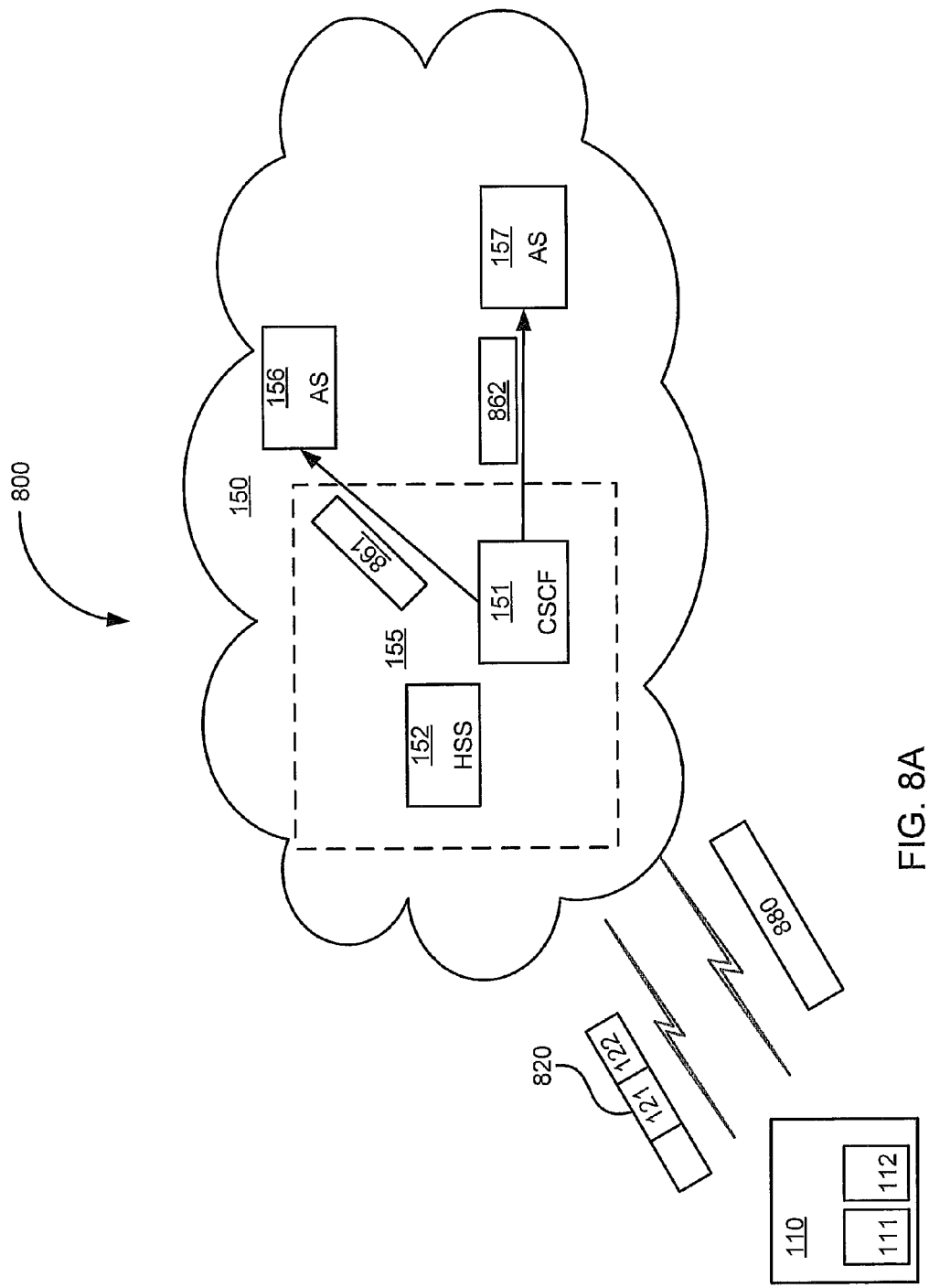
FIG. 8A shows an exemplary embodiment of the invention.
Figure 9A:
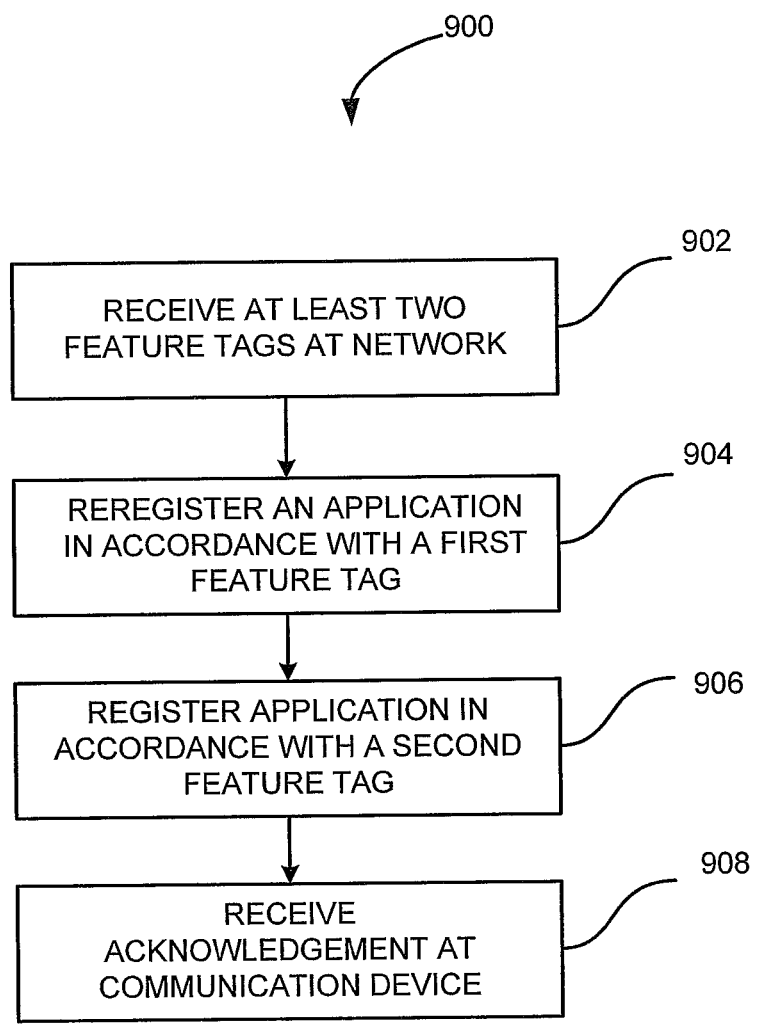
FIG. 9A shows a flow diagram of a method in accordance with the invention.

FIG. 9A shows a method 900 of the invention that can be used to re-register a first application and register a second application. At block 902, at least 2 feature tags can be received at the communications network 150. Referring to FIG. 8A the feature tags 111 and 112 can be included in a register/deregister signal 820 sent from the communication device 110 to the communications network 150. The register/deregister signal 820 can be used to re-register and/or de-register an application with the communications network 150. In an exemplary embodiment, the register/deregister signal 820 has generally the same format as the registration signal 120 and generally conforms to a SIP REGISTER message format. Additional fields may be added to the SIP REGISTER message to accommodate the expression of at least two feature tags. At block 904 a currently registered application 111 identified by the feature tag 121 can be re-registered. Referring to FIG. 8A, re-registration of the application 111 can be performed by sending a registration signal 861 to the AS 156. At block 906, a currently unregistered application 112 identified by the feature tag 122 can be registered by sending a server registration signal 862 to the AS 157. At block 908 an acknowledgement message 880 can be received at the communication device 110. In a preferred embodiment, the acknowledgement 880 generally conforms to the SIP 200 OK message and can list currently registered applications. In the case at hand, the acknowledgement message 880 can list the applications 111 and 112 as currently registered. Thus by using the method 900 of the present invention, re-registration with the addition of service is performed in a manner that reduces the traffic over the air interface and decreases the amount of time necessary to perform the re-registration and additional initial registration tasks.

Figure 8B:
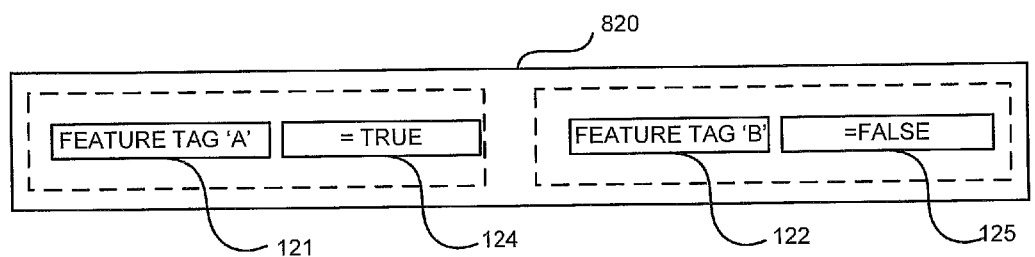
FIG. 8B shows an exemplary embodiment of the invention.
Figure 9B:
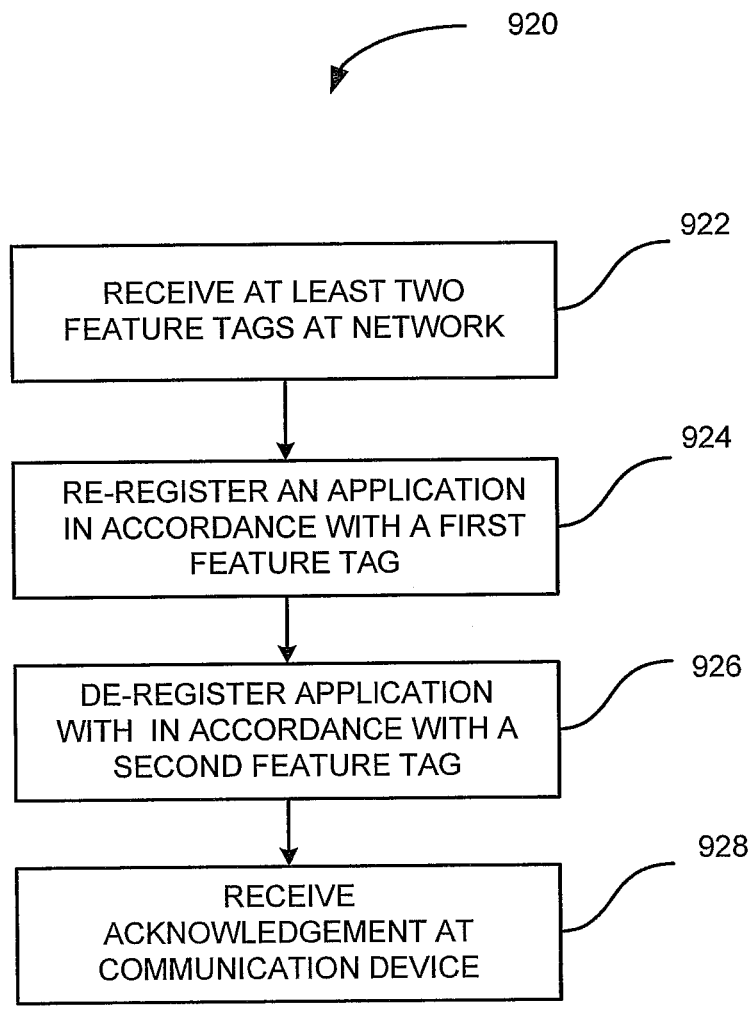
FIG. 9B shows a flow diagram of a method in accordance with the invention.

FIG. 9B shows an exemplary method 920 of the invention which can be used to re-register a first service and de-register a second service. For example, the application 111 may be a PoC application and the application 112 may be a VoIP application, with the application 112 options set to discontinue VoIP operation when in a roaming mode. A user may be registered for both services while he is operating within his carrier home network area. However, as the user moves outside his home network and begins roaming on a second carrier's network, he may re-register for the PoC service, but discontinue VoIP service. At block 922 the feature tags 121 and 122 can be received at the communications network 150. In an exemplary embodiment, the register/deregister signal 820 received at the communications network 150 at block 922 can appear as shown in FIG. 8B and contain the feature tag 121 with a feature tag status value 124 set to TRUE and the feature tag 122 with a value 124 set to FALSE, where TRUE indicates that a current registration is to be renewed and FALSE indicates that a current registration is to be discontinued. It is noted that the invention can also be practiced by establishing alternative expressions for the value 124 to indicate registration or no registration.

Figure 8D:
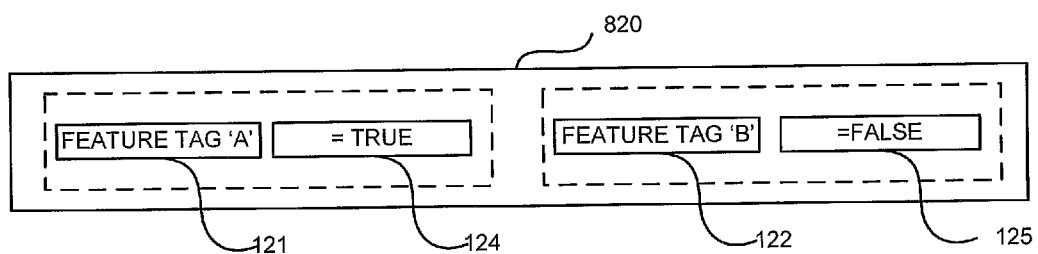
FIG. 8D shows an exemplary embodiment of the invention.
Figure 8C:
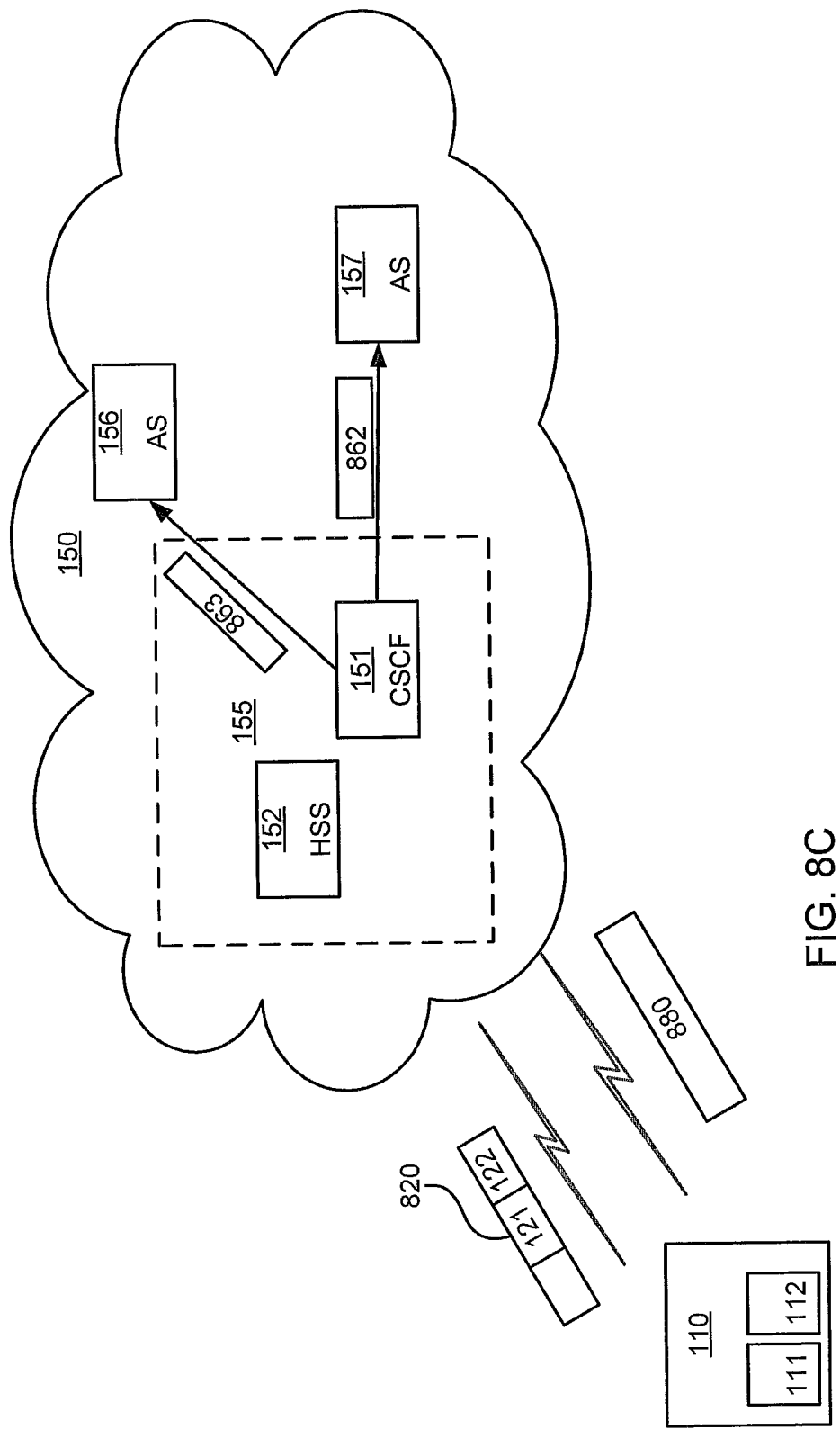
FIG. 8C shows an exemplary system of the invention.

At block 924, the application 112 identified by the feature tag 122 that is associated with the feature tag status value 124 that is set to TRUE can be re-registered with the AS 157 by sending the server registration message 862 to the AS 157. At block 926, the application 111 identified by the feature tag 121 that is associated with the feature tag status value 125 that is set to FALSE can be de-registered by sending a de-registration signal 863 to the AS 156, as shown in FIG. 8C. In an exemplary embodiment, the de-registration signal 863 is the SIP REGISTER message with an expiration field set to zero. However, the de-registration signal 863 can be a message of any format compatible with the AS 156 that indicates that the binding of the contact address associated with the application 111 on the communication device 110 should be released; or otherwise results in the de-registration of the application 111 with the AS 156 so that application 111 service is discontinued. At block 928 an acknowledgement message 880 can be received at the communication device 110. In an exemplary embodiment, the acknowledgement 880 can contain the feature tag 121 with its feature tag status value 124 set to FALSE to indicate the de-registration of the application 111, and the feature tag 122 with its feature tag status value 124 set to TRUE to indicate re-registration. Thus the method 920 of the invention can provide a re-registration process by which a first application 111 registration can be renewed and a second application 112 registration can be cancelled via a single message 820 transmitted over the air to the communication system 150. In addition, a confirmation of the re-registration and de-registration can be obtained in some embodiments via a single acknowledgement message 880 transmitted over the air to the communication device 110. By reducing traffic over the air interface, network efficiency is increased while latency is decreased.

Figure 9C:
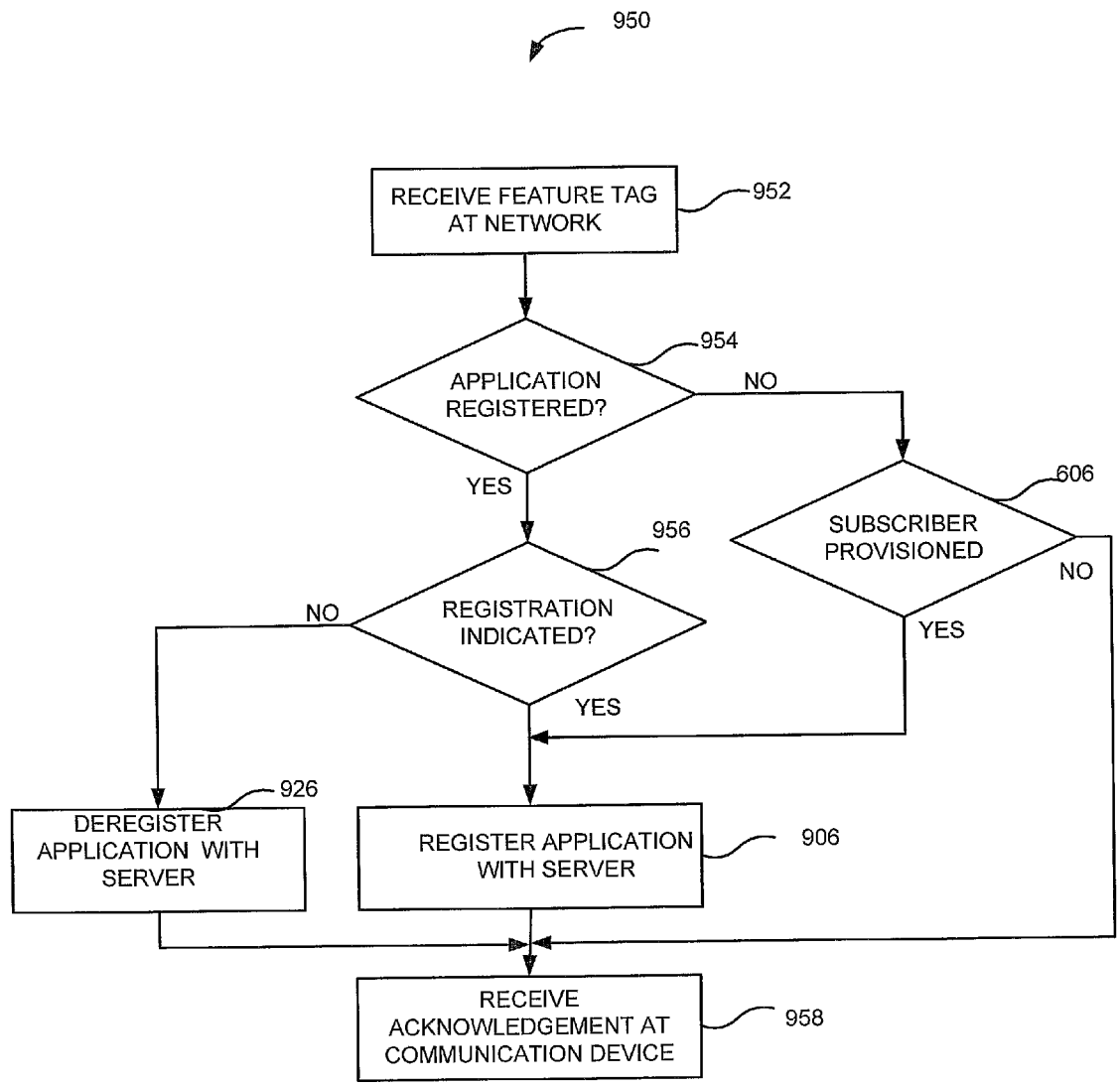
FIG. 9C shows a flow diagram of a method in accordance with the invention.

FIG. 9C shows a flow diagram of an exemplary method 950 of the invention that can be used to re-register, re-register and add service, or re-register and de-register applications with the communications network 150 in accordance with the feature tags 121 and 122. In a first example, assume that the application 111 is currently registered, and is to be renewed, and the application 112 is not currently registered and is to be registered. At block 952, the communications network 150 can receive the feature tags 121 and 122 which can be included in the register/deregister signal 820 sent from the communication device 110. At block 954 a decision can be made as to whether the applications 111 and 112 identified by the feature tags 121 and 122 are currently registered. In an exemplary embodiment, the IMS core 155 maintains a list of current bindings or registrations. Since a current binding exists for a user at an address associated with the application 111 identified by the feature tag 121 contained within the register/deregister signal 820, it is determined that the application 111 is currently registered. Since the application 111 is currently registered, at block 956 a determination is made as to whether re-registration of the application 111 is indicated. In an exemplary embodiment, the feature tag 121 can appear in the register/deregister signal 820 without an associated feature tag status value 124, as shown in the signal message 120 of FIG. 3A, in which case the presence of the feature tag 121 within the register/deregister signal 820 can indicate that re-registration is requested. In a further embodiment the feature tag 111 can be accompanied by its feature tag status value 124, as shown in FIG. 3B, which can be assigned a value of TRUE since the registration for the application 111 is to be renewed. Since re-registration is indicated at decision block 956, the application 111 can be registered with the application server 156 at block 906.

Regarding the application 112 identified by the feature tag 122, it can be determined at decision step 953, that there is no current registration for the application 112. Therefore, at block 606 a check can be performed to determine whether application 112 service is provisioned for the communication device 110 user. If the subscriber is entitled to service related to the application 112, then registration can be performed in accordance with the feature tag 122 at block 906. The server registration signal 862 can be sent to the AS 157 to register the application 112. Following the completion of both registrations, the acknowledgement message 880 can be received at the communication device 110 at block 958 and confirm the successful registrations of the applications 111 and 112.

As a second example, assume both of the applications 111 and 112 are currently registered with the communications network 150 and it is desired to renew service for the application 111, but discontinue service for the application 112. In this case the register/deregister signal 820 received at the communications network 150 at block 952 can appear as shown in FIG. 8D and contain the feature tag 121 with a value 124 set to TRUE and the feature tag 122 with a value 124 set to FALSE, where TRUE indicates that a current registration is to be renewed and FALSE indicates that a current registration is to be discontinued. Since the application 111 is to be re-registered, and re-registration via method 950 was discussed in the preceding paragraphs, it will not be discussed again here. Turning to the application 112 which is to be de-registered, at decision block 954 it is determined that the application 112 is currently registered. At block 956 a determination is made whether re-registration is indicated. Since the feature tag 122 is accompanied by a feature tag status value 124 that is set to FALSE as shown in FIG. 8D, it is determined at block 956 that re-registration is not indicated. Accordingly, at block 926 the application 112 can be de-registered. A de-registration 863 signal can be sent to the AS 157 to de-register the application 112. The acknowledgement message 880 can be received at block 958 and confirm the registration of application 111 and the de-registration of the application 112.

In addition to providing efficient methods for network registration, re-registration, and de-registration, the present invention further provides a method by which registration of the application 111 can be performed when the application 111 is present on a communication device and one or more predetermined registration conditions are satisfied. For example, a network operator may provide VoIP service to users that access the network via a WLAN access network, but not to users that access the network via a UMTS access network. Accordingly, a predetermined condition for VoIP registration can be the use of a particular access network. Other predetermined conditions can also be established.

Figure 10A:
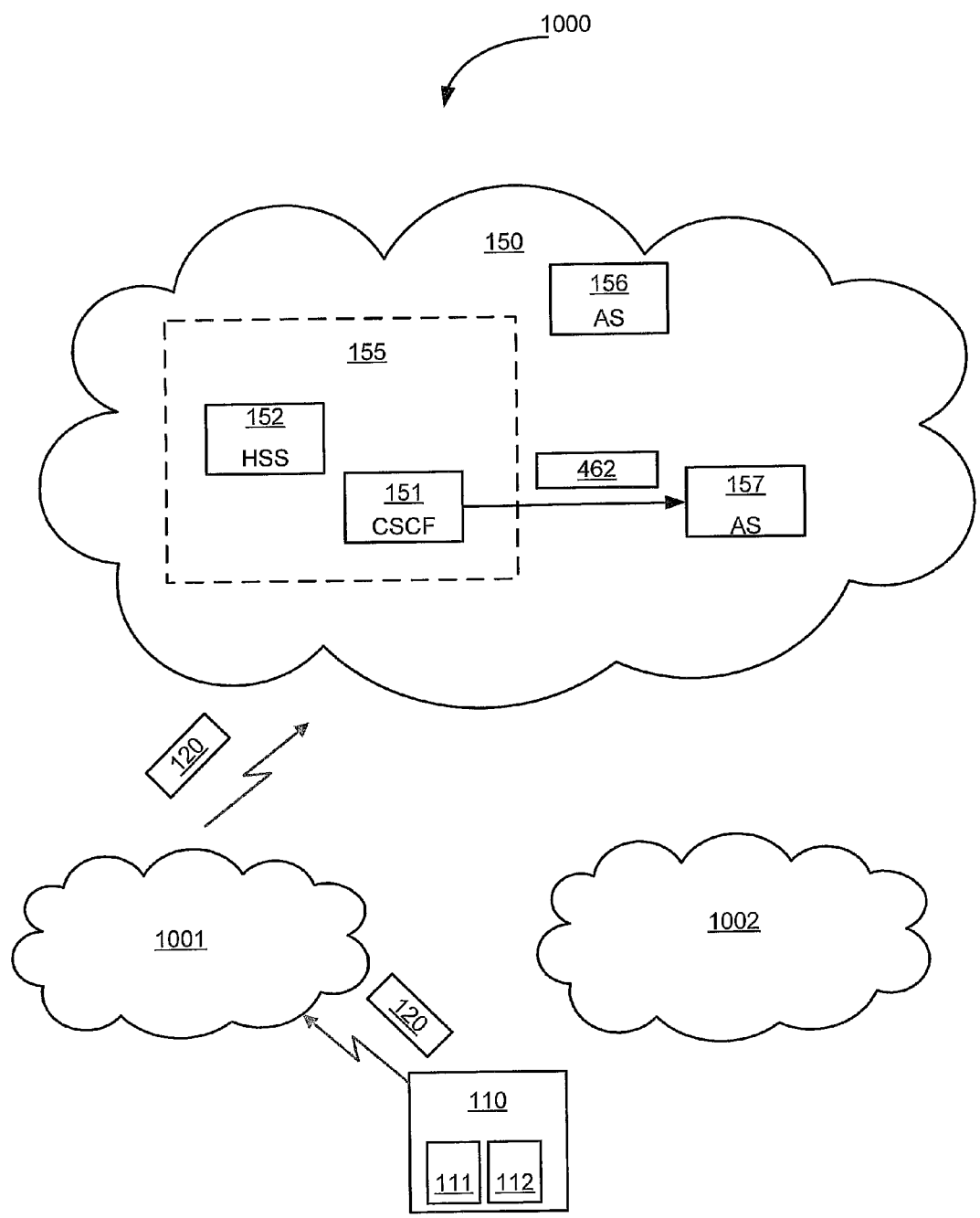
FIG. 10A shows an exemplary system of the invention.
Figure 10B:
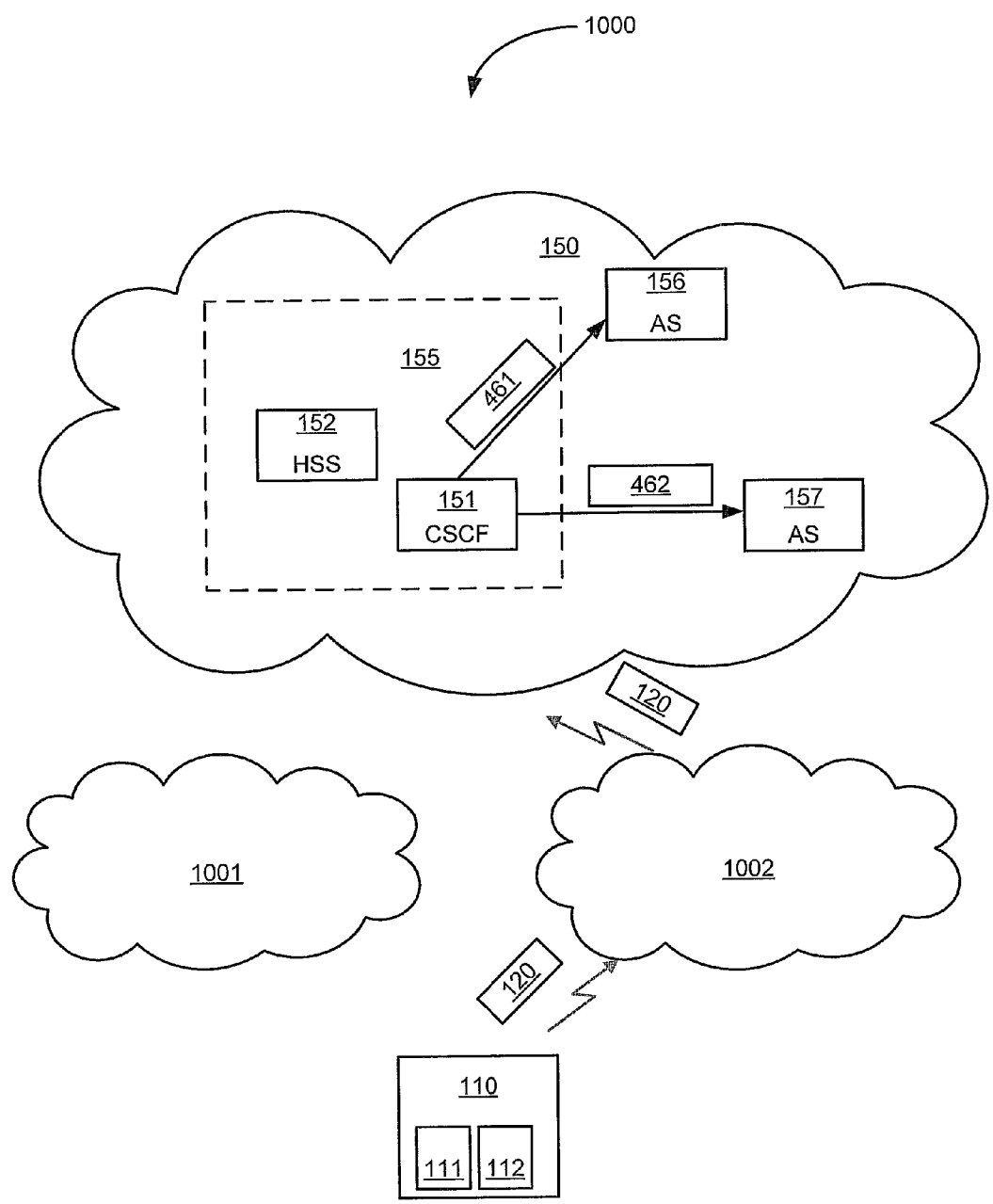
FIG. 10B shows an exemplary system of the invention.

FIG. 10A shows a system 1000 of the invention that includes the communication device 110 equipped with the first application 111 and the second application 112, a first radio access network 1001, a second radio access network 1002, and the communications system 150, which includes the IMS core 155 and the AS 156 and 157. In an exemplary embodiment, the AS 156 is a VoIP server and the AS 157 is a PoC server. In addition, the first radio access network 1001 is a UMTS network and the second radio access network 1002 is a WLAN network.

Figure 11:
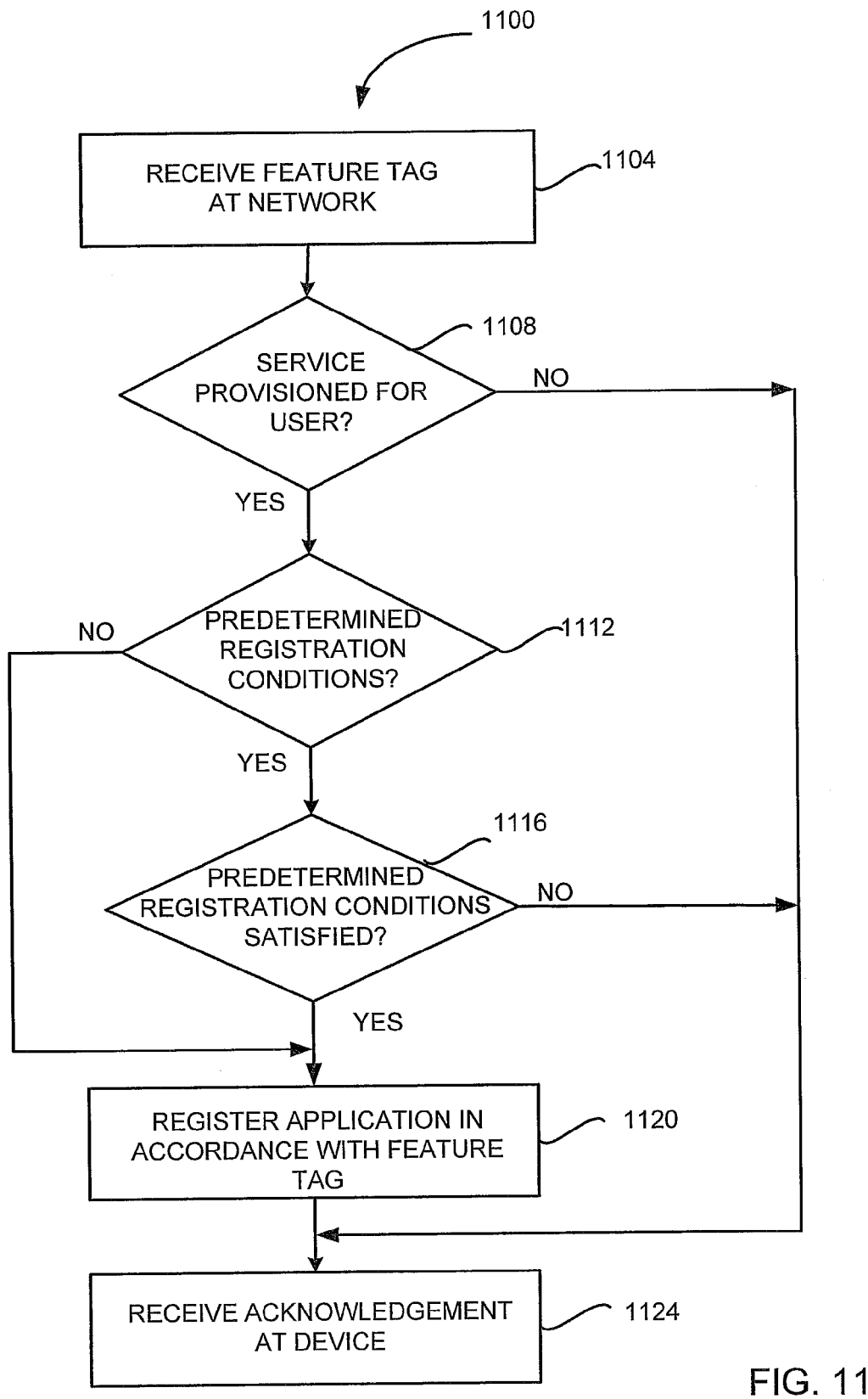
FIG. 11 shows a flow diagram of an exemplary method of the invention.

FIG. 11 shows a flow diagram of an exemplary method 1100 of the invention which can be implemented by the system 1000 to register the application 111 in accordance with a feature tag 121 and a predetermined registration condition. Referring to FIGS. 10A and 11, at block 1104 the feature tags 121 and 122, which identify VoIP and PoC applications respectively, can be received at the communications network 150. At decision block 1108 a check can be performed to determine whether any predetermined conditions exist for the registration of applications 111 and 112. In an exemplary embodiment, logic for checking for the existence of predetermined registration conditions resides at the CSCF 151 of the IMS core 155, however it may reside at an alternative component of the communications system 150. In an alternative embodiment, logic for checking for the existence of predetermined registration conditions can reside at the communication device 110. In the example at hand, there is a predetermined registration condition for VoIP registration, namely the requirement that the communication device 110 access the communications network 150 via a WLAN access network. Thus, at decision block 1112 a determination is made as to whether predetermined conditions exist. If no such conditions exist, operation can continue to block 1120. If such conditions do exist a determination can be made at decision block 1116 as to whether the predetermined condition is satisfied. In an exemplary embodiment, the access network employed is identified in the signal message 120, which generally conforms to the SIP REGISTER message. The SIP header contains a field (P-Access-Network-Info) in which network access information can be expressed. By checking the appropriate field in the signal message 120 it can be ascertained whether the predetermined registration condition is satisfied. In FIG. 10A the signal message 120 is sent over the first radio access network 1001 which is a UMTS network, consequently the predetermined registration condition for the VoIP application 111 is not satisfied. As a result, the application 111 is not registered with the AS 156.

Regarding the PoC application 112 registration, at decision block 1112 it can be determined that no predetermined registration condition exists for the registration of the application 112. Therefore, at block 1120 the application 112 can be registered in accordance with the feature tag 122 by sending the server registration message 462 to the AS 157. At block 1124 the communication device 110 can receive an acknowledgement message 880 which can list the successful registration of the application 112.

Consider now the example in which the communication device 110 accesses the communications network 150 via the radio access network 1002, which, in an exemplary embodiment, is a WLAN network. In this case, the predetermined condition for the application 111 is satisfied at block 1116. Therefore a server registration message 461 can be sent to the AS 156 at block 1120. In this case, the acknowledgement message 880 sent to the communication device 110 at block 1124 can confirm the registration of the application 111 and the application 112. Thus, the methods of the invention provide a process by which the registration of an application present on a communication device 110 can be performed subject to predetermined registration conditions.

Figure 12:
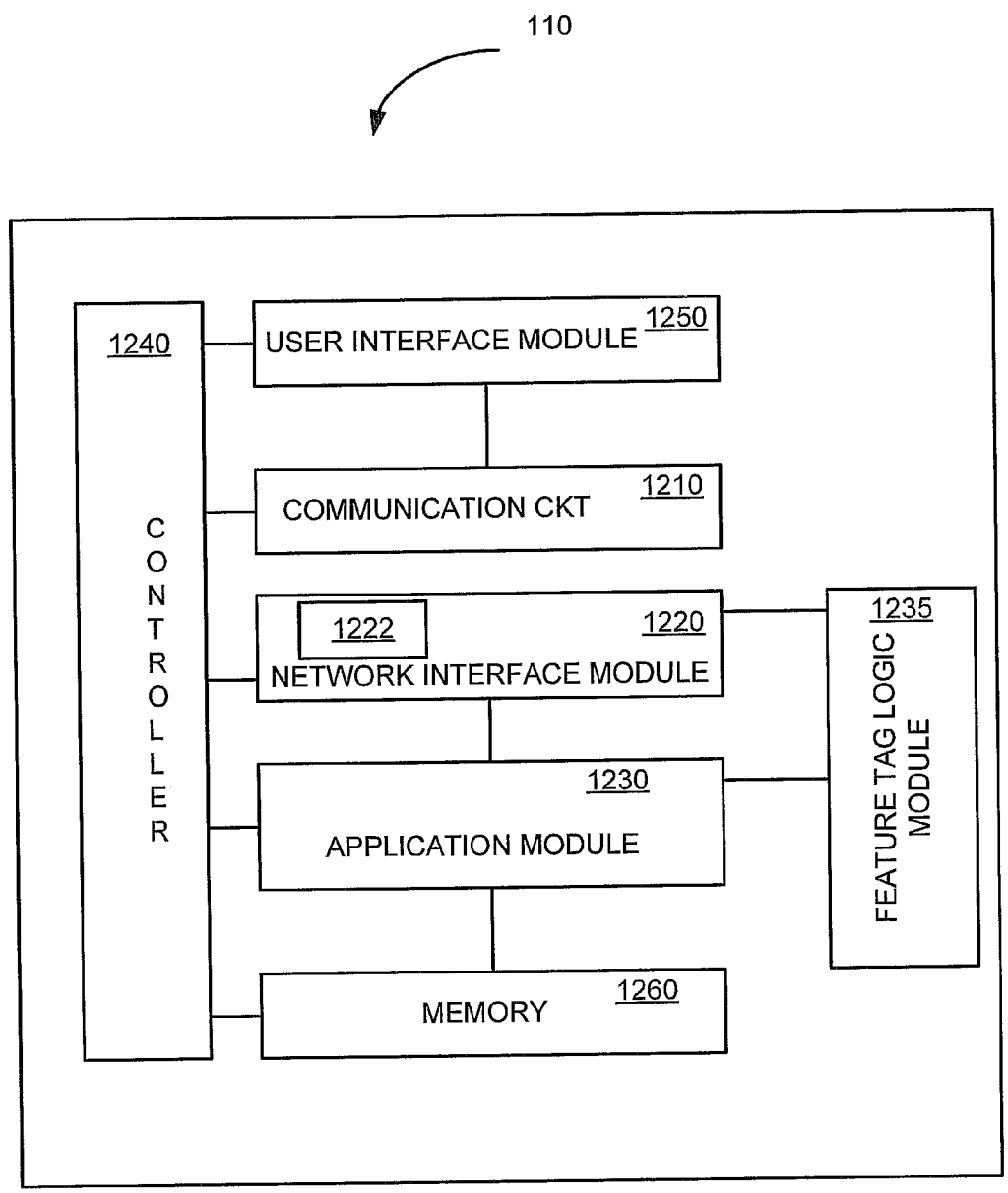
FIG. 12 shows an exemplary embodiment of a device of the invention.

As shown in the previous figures, the feature tag 121 of the invention can be contained within the signal message 120 which can be sent from the communication device 110 to the communications network 150. FIG. 12 shows an exemplary embodiment of the communication device 110. The communication device 110 can contain a communications circuitry module 1210, a network interface module 1220, an applications module 1230, a feature tag logic module 1235, a controller 1240, a user interface portion 1250 and a memory 1260. The communications circuitry module 1210 can include a transceiver, signal processor, filters, amplifiers, a microphone, a speaker, an antenna, a power source and other electronic circuitry (not shown) that can be used to power the communication device 110 and transmit and receive radio transmissions. The communications module 1210 can be communicatively coupled to a controller 1240, which can perform control functions for the communication device 110. In an exemplary embodiment, the controller 1240 can be implemented by a microprocessor. The controller 1240 can be coupled to a memory 1260, which can comprise a Random Access Memory, a Read Only Memory, or a combination of a RAM and a ROM. The ROM can be used to store instructions for the controller 1240. The RAM can be used to store received messages, contact information, and user preferences, as well as other types of data. The controller 1240 can also be communicatively coupled to a user interface portion 1250 which can receive input from a user as well as deliver information to a user. As an example, the user interface portion 1250 can include a keypad adapted to receive input from a user, and a display unit communicatively coupled to said keypad from which a user can view text messages, select options, play games, view downloads, etc. The applications module 1230 can include at least one application that resides on the communication device 110 and performs a particular function. In the exemplary embodiment depicted in FIG. 12, the applications module 1230 contains the application 111 and the application 112. The applications 111 and 112 can comprise software, hardware, firmware, or some combination thereof. In an exemplary embodiment, the applications 111 and 112 are IMS applications. By way of example, but not limitation, the application can be a VoIP application, a PoC application, or an IM application that can facilitate some form of communication via the IMS network. The feature tag logic module 1235 can contain logic related to the generation of the feature tag 121 as will be discussed later. The applications module 1230 can be communicatively coupled to the controller 1240 and to a network interface module 1220. The network interface module 1220 can facilitate communication with the communications network 150 and can include software, firmware, hardware or some combination thereof.

The network interface module 1220 can compose and format messages that can be sent from the communication device 110 to the communications network 150. It can also receive messages routed via the communications network 150. In an exemplary embodiment, the network interface module 1220 is an IMS layer of the communication device 110 and comprises an IMS client that is adapted to enable communication between the communication device 110 and the IMS core 155. The IMS client can produce the signal message 120 that contains at least one feature tag 121. In an exemplary embodiment, the feature tag 121 can be registered at the communication device 110 before it is inserted in the signal message 120. It should be understood that modules can be implemented in hardware, software, firmware, or a combination thereof.

Figure 13:
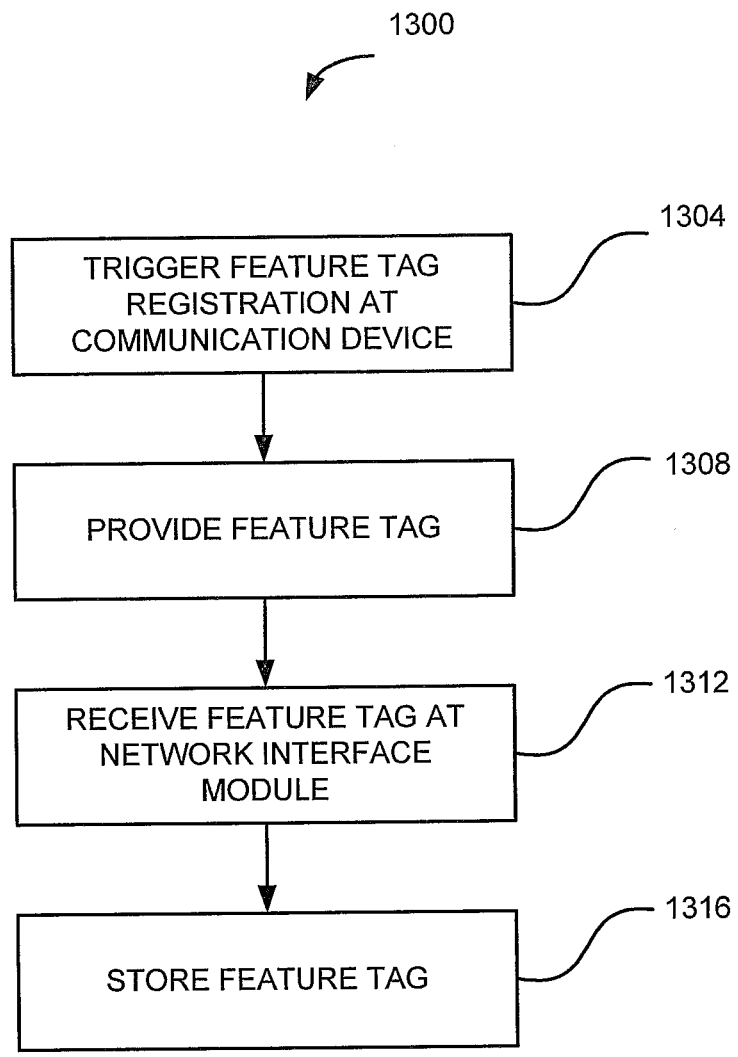
FIG. 13 shows a flow diagram of a method in accordance with the invention.

FIG. 13 shows a flow diagram of a method 1300 by which a feature tag 121 associated with an application 111 can be registered at the communication device 110. At block 1304 the feature tag registration process can be triggered by performance of a predetermined triggering action. By way of example, and not of limitation, the predetermined triggering action can be the powering on of the device, the downloading of a new application, the insertion or removal of a SIM card, or the deletion of an application from the application module 1230. In an exemplary embodiment, logic used to detect and respond to the triggering event can be present at the feature tag logic module 1235. Alternatively, it can reside at the application module 1230, or at the controller 1240, or elsewhere at the communication device 110. In an exemplary embodiment, the application 111 is adapted to respond to the triggering action by providing the feature tag 121 at block 1308 to the network interface module. At block 1312 the feature tag 121 can be received at the network interface module 1220. In an exemplary embodiment, the feature tag 121 is received at an IMS client. However the feature tag 121 can be received at any client or application that can facilitate communication with the communications network 150 and is adapted to receive the feature tag 121. The network interface module 1220 can receive multiple feature tags at block 1312, as any number of applications can be included in the applications module 1230. At block 1316 the received feature tag 121 can be stored. In an exemplary embodiment, the network interface module 1220 can include a memory 1222 to store the feature tag 121 that is received at the block 1312.

Figure 14:
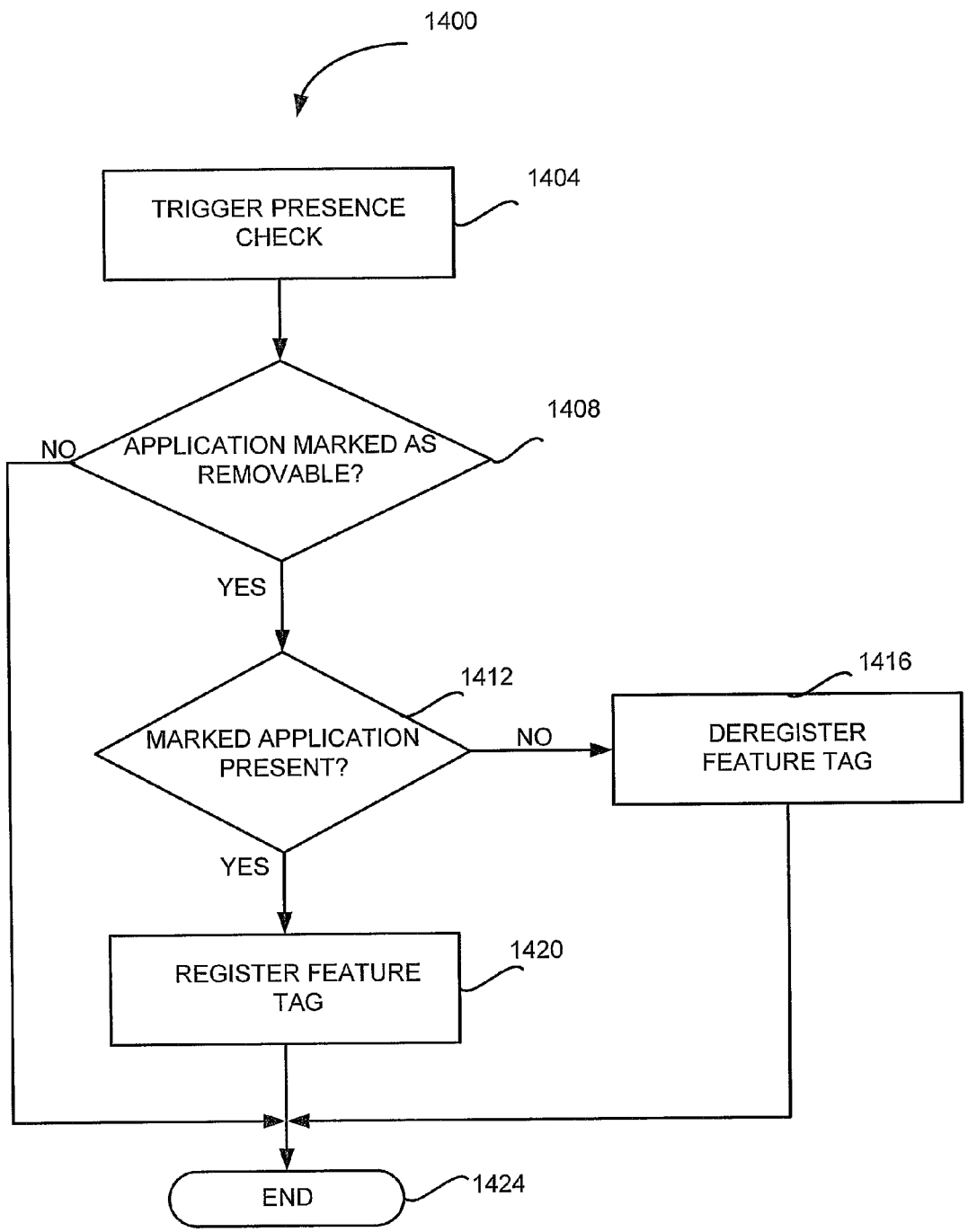
FIG. 14 shows a flow diagram of a method in accordance with the invention.

Many communication devices are equipped with a SIM card that, in addition to storing subscriber identification information, can also contain an application such as a VoIP, PoC or other application. The present invention further provides a method 1400 for checking for the presence of applications stored on a removable medium as shown in FIG. 14. At block 1404 a check for the presence of applications stored on removable media can be triggered by the performance of a predetermined triggering action. The triggering action can be the powering on of the device, the insertion or removal of a SIM card, or some other predetermined triggering action. Applications on removable media can be designated as such so that their presence can be checked. For example, a memory or database within the applications module 1230 or the network interface module 1220, or the memory 1260, can be used to store information regarding applications that are marked as stored on removable media. At block 1408 a check can be performed to determine whether any application has been so marked. By way of example, but not of limitation, the logic for performing this check can reside at the applications module 1230, the feature tag logic module 1235, the network interface module 1220, or the memory 1260. If there is a record of a marked application, then at block 1412 a check can be performed to determine whether the marked application is present at the communication device 110. For the sake of example, assume the application 111 is marked as removable and is present at the communication device 110. At block 1420 the feature tag 121 can be sent to the network interface module 1220.

As a further example, assume the marked application 111 is not present at the communication device 110. In this case the feature tag 121 can be de-registered at the communication device 110 at block 1416. In an exemplary embodiment, the feature tag logic module 1235 can send the feature tag 121 to the network interface module 1220 with the feature tag status value 124 set to FALSE to de-register the feature tag 121.

Thus the present invention provides methods that can register an application 111 at the communication device 110 by submitting a feature tag 121 111 to the network interface module 1220. In an exemplary embodiment, the feature tag 121 can subsequently be used to notify the IMS core 155 of the presence of the application 111 on the communication device 110. In turn, the IMS core 155 can execute a desired action in response to the reception of the feature tag 121. For example, the IMS core 155 can register the application 111 with the associated AS 156, update the presence server PS 158 or de-register the application 111.

Figure 15:
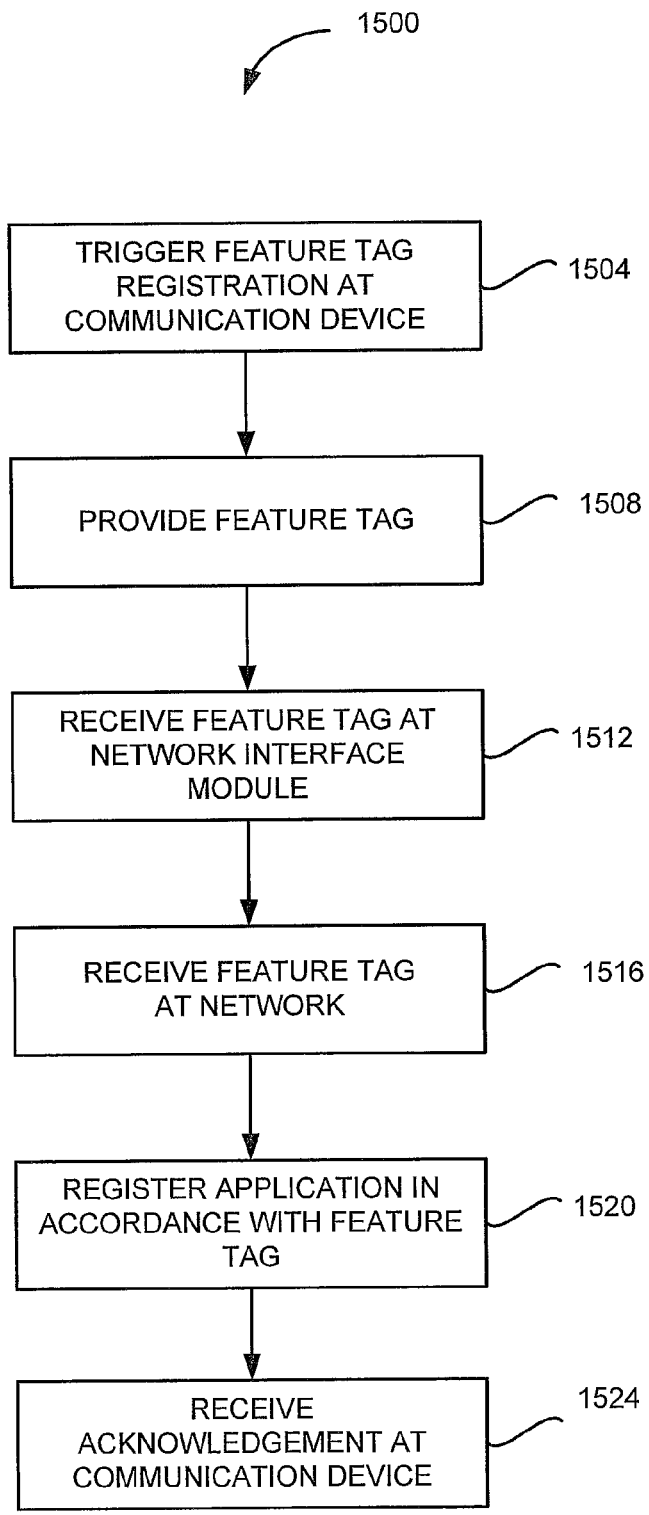
FIG. 15 shows a flow diagram of an exemplary method of the invention.

FIG. 15 shows a flow diagram of an exemplary method 1500 of the invention in which a feature tag 121 can be registered at the device 110 and the application 111 identified by the feature tag 121 can be registered, re-registered or de-registered with the AS 156 of a communications network 150. At block 1504 an action can occur that triggers the registration of the feature tag 121 at the communication device 110. As mentioned previously, the triggering event may be powering on the device, downloading a new application, insertion of a SIM card, or some other predetermined event. At block 1508 the feature tag 121 associated with the application 111 can be provided to the network interface module. At block 1512 the feature tag 121 can be received at the network interface module 1220 and subsequently stored. In an exemplary embodiment, the stored feature tag 121 can be retrieved and inserted into a signal message 120 that is sent from the communication device 110 to the communications network 150 so that the communications network 150 can be notified of the presence of the application 111 on the communication device 110. At block 1516 the feature tag 121 can be received at the communications network 150. In an exemplary embodiment, the communications network 150 comprises the IMS core 155 and the application server 156, wherein the IMS core 155 includes the CSCF 151 and the HSS 152, and the feature tag 121 is received at the CSCF 151. Having received the feature tag 121, the communications network 150 can execute a desired action in response to receiving the feature tag 121. Registration of the application 111 in accordance with the feature tag 121 can be performed at block 1520. In a first embodiment, the presence of the feature tag 121 can indicate that the application 111 is to be registered with the application server 156, and the absence of the feature tag 121 indicates that the application 111 is not to be registered. In a further embodiment the feature tag 121 can include the feature tag status value 124, which when set to TRUE or some first predetermined value indicates that the application 111 is to be registered, and when set to FALSE or some second predetermined value, indicates that the application 111 is to be de-registered. At block 1524, an acknowledgement 880 can be received at the communication device 110. In a preferred embodiment, the acknowledgement 880 is in the form of the SIP 200 OK message and includes a list of currently registered applications. A method of the invention can further include verifying user provisioning and performing registration in accordance with predetermined registration conditions such as shown in FIGS. 6 and 11.

Thus, the present invention provides systems, methods and devices for indicating the presence of at least one application 111 on a communication device 110 to the communications network 150 by sending a feature tag 121 associated with an application 111 to the communications network 150. The communications network 150 can use the feature tag 121 to execute a desired action, such as third party registration, re-registration, or de-registration of the application 111 with an AS 156 in a manner that conserves resources, decreases traffic over the air interface and decreases system latency. Alternatively, the feature tag 121 can be used to prompt updates to a PS 158 of presence information regarding the application 111.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A method, comprising:
 receiving, by an internet-protocol-multimedia-system core, a message sent by a wireless communication device, wherein:
  the message comprises a feature tag corresponding to each internet-protocol-multimedia-system application present at a memory of the wireless communication device; and
  the feature tag corresponding to each application is associated with a feature tag status value to indicate whether the application should be registered with a communication system according to a routine selected from a group consisting of:
   the application should be registered if a corresponding wireless communication access type is a first wireless communication access type and should not be registered if the corresponding wireless communication access type is not the first wireless communication access type; and
   the application should be registered if a current wireless communication network being used by the wireless communication device is a home network for the wireless communication device and should not be registered if the current wireless communication network is a roaming network for the wireless communication device; and
 executing, by the internet-protocol-multimedia-system core, in connection with each application, based on the feature tag corresponding to the application, and depending on whether the application is presently registered with the communication system, an action selected from a group consisting of:
  re-registering, to the internet-protocol-multimedia-system server, the application being already registered with the Internet-protocol-multimedia-system server; and
  de-registering, from the internet-protocol-multimedia-system server, the application registered with the internet-protocol-multimedia-system server.

2. The method of claim 1, wherein the internet-protocol-multimedia-system server is a presence server.

3. The method of claim 1, wherein the first wireless communication type is a wireless-local-area-network communication type.

4. The method of claim 1, wherein the internet-protocol-multimedia-system core includes an internet-protocol-multimedia-system call-state-control function.

5. The method of claim 1, wherein the routine requiring that the application should be registered if the corresponding wireless communication access type is the first wireless communication access type and should not be registered if the corresponding wireless communication access type is not the first wireless communication access type requires further that the application should not be registered only if the corresponding wireless communication access type is not the first wireless communication access type and is a second wireless communication access type.

6. The method of claim 5, wherein one of the applications is a voice-over-internet-protocol application and the second wireless communication access type is a universal mobile telecommunications system communication type.

7. The method of claim 1, wherein the internet-protocol-multimedia-system server is an application server.

8. The method of claim 7, wherein at least one of the applications is an internet-protocol-multimedia-system application.

9. The method of claim 7, further comprising:
 collecting acknowledgement messages from the application server;
 assembling the acknowledgement messages into a master acknowledgement message; and
 sending the master acknowledgement message to the wireless communication device.

10. A system, comprising:
 a processor; and
 a computer-readable medium comprising computer-executable instructions that, when executed by the processor, cause the processor to perform operations comprising:
  receiving a message sent by the wireless communication device, wherein:
   the message comprises a feature tag corresponding to each internet-protocol-multimedia-system application present at a memory of a wireless communication device; and
   the feature tag corresponding to each application is associated with a feature tag status value to indicate whether the application should be registered with a communication system according to a routine selected from a group consisting of:
    the application should be registered if a corresponding wireless communication access type is a first wireless communication access type and should not be registered if the corresponding wireless communication access type is not the first wireless communication access type; and the application should be registered if a current wireless communication network being used by the wireless communication device is a home network for the wireless communication device and should not be registered if the current wireless communication network is a roaming network for the wireless communication device; and executing, in connection with each application, based on the feature tag corresponding to the application, and depending on whether the application is presently registered with the communication system, an action selected from a group consisting of:

re-registering, to the internet-protocol-multimedia-system server, the application being already registered with the internet-protocol-multimedia-system server; and de-registering, from the internet-protocol-multimedia-system server, the application registered with the internet-protocol-multimedia-system server.

11. The system of claim 10, wherein the first wireless communication type is a wireless-local-area-network communication type.

12. The system of claim 10, wherein the processor and computer-readable medium are parts of an internet-protocol-multimedia-system call-state-control function.

13. The method of claim 10, wherein:
the internet-protocol-multimedia-system server is an application server; and
at least one of the applications is an internet-protocol-multimedia-system application.

14. The system of claim 10, wherein:
the internet-protocol-multimedia-system server is an application server; and
the operations further comprise:
collecting acknowledgement messages from the application server;
assembling the acknowledgement messages into a master acknowledgement message; and
sending the master acknowledgement message to the wireless communication device.

15. The system of claim 10, wherein the routine requiring that the application should be registered if the corresponding wireless communication access type is the first wireless communication access type and should not be registered if the corresponding wireless communication access type is not the first wireless communication access type requires further that the application should not be registered only if the corresponding wireless communication access type is not the first wireless communication access type and is a second wireless communication access type.

16. The system of claim 15, wherein one of the applications is a voice-over-internet-protocol application and the second wireless communication access type is a universal mobile telecommunications system communication type.

17. A computer-readable storage device comprising computer-executable instructions that, when executed by a processor, cause the processor to perform operations comprising:
receiving a message sent by the wireless communication device, wherein:

the message comprises a feature tag corresponding to each internet-protocol-multimedia-system application present at a memory of a wireless communication device; and the feature tag corresponding to each application is associated with a feature tag status value to indicate whether the application should be registered, re-registered, or de-registered with a communication system according to a routine selected from a group consisting of:

the application should be registered if a corresponding wireless communication access type is a first wireless communication access type and should not be registered if the corresponding wireless communication access type is not the first wireless communication access type; and the application should be registered if a current wireless communication network being used by the wireless communication device is a home network for the wireless communication device and should not be registered if the current wireless communication network is a roaming network for the wireless communication device; and executing, in connection with each application, based on the feature tag corresponding to the application, and depending on whether the application is presently registered with the communication system, an action selected from a group consisting of:

re-registering, to the internet-protocol-multimedia-system server, the application being already registered with the Internet-protocol-multimedia-system server; and de-registering, from the internet-protocol-multimedia-system server, the application registered with the internet-protocol-multimedia-system server.

18. The computer-readable storage device of claim 17, wherein:
the internet-protocol-multimedia-system server is an application server; and
the operations further comprise:
collecting acknowledgement messages from the application server;
assembling the acknowledgement messages into a master acknowledgement message; and
sending the master acknowledgement message to the wireless communication device.

19. The computer-readable storage device of claim 17, wherein the routine requiring that the application should be registered if the corresponding wireless communication access type is the first wireless communication access type and should not be registered if the corresponding wireless communication access type is not the first wireless communication access type requires further that the application should not be registered only if the corresponding wireless communication access type is not the first wireless communication access type and is a second wireless communication access type.

20. The computer-readable storage device of claim 19, wherein one of the applications is a voice-over-internet-protocol application and the second wireless communication access type is a universal mobile telecommunications system communication type.

* * * * *